(12) United States Patent  
Dratewski

(10) Patent No.: US 9,371,042 B1  
(45) Date of Patent: Jun. 21, 2016

(54) APPARATUS FOR CONNECTING A BICYCLE TO A MOTOR VEHICLE AND METHOD OF USE

(71) Applicant: George Jerzy Dratewski, Wheeling, IL (US)

(72) Inventor: George Jerzy Dratewski, Wheeling, IL (US)

( * ) Notice: Subject to any disclaimer, the term of this patent is extended or adjusted under 35 U.S.C. 154(b) by 0 days.

(21) Appl. No.: 14/336,006

(22) Filed: Jul. 21, 2014

Related U.S. Application Data

(60) Provisional application No. 61/958,423, filed on Jul. 29, 2013.

(51) Int. Cl.  
*B60R 9/06* (2006.01)  
*B60R 9/10* (2006.01)

(52) U.S. Cl.  
CPC .... *B60R 9/10* (2013.01); *B60R 9/06* (2013.01)

(58) Field of Classification Search  
None  
See application file for complete search history.

(56) References Cited

U.S. PATENT DOCUMENTS

| | | | | |
|---|---|---|---|---|
| 2,379,994 A | * | 7/1945 | Schwinn | B60R 9/10 211/17 |
| 4,629,104 A | * | 12/1986 | Jacquet | B60R 9/10 211/17 |
| 5,476,203 A | * | 12/1995 | Fletcher | B60R 9/10 211/22 |
| 5,607,064 A | * | 3/1997 | Fourel | B60R 9/10 211/22 |
| 5,947,357 A | * | 9/1999 | Surkin | B60R 9/06 211/22 |
| 6,431,423 B1 | | 8/2002 | Allen et al. | |
| 6,626,340 B1 | * | 9/2003 | Burgess | B60R 9/048 224/323 |
| 2012/0119427 A1 | | 5/2012 | Weissenborn | |

FOREIGN PATENT DOCUMENTS

| | | | | |
|---|---|---|---|---|
| EP | 2505463 A1 | * | 10/2012 | B60R 9/10 |
| FR | 2377317 A1 | * | 8/1978 | B60R 9/10 |
| FR | 2829082 A1 | * | 3/2003 | B60R 9/06 |
| WO | WO-2010/085199 A1 | * | 7/2010 | B60R 9/06 |

* cited by examiner

*Primary Examiner* — Gary Elkins  
(74) *Attorney, Agent, or Firm* — Ted Masters

(57) ABSTRACT

Apparatus and method for connecting a bicycle to a motor vehicle includes a crank axle support which supports the crank axle of the bicycle, a crank arm connector which connects to the crank arm of the bicycle, and a down tube connector which connects to the down tube of the bicycle. The crank arm connector and the down tube connector are adjustable to accommodate different style and size bicycles. The apparatus can be placed in in-use, lowered, and storage positions.

12 Claims, 27 Drawing Sheets

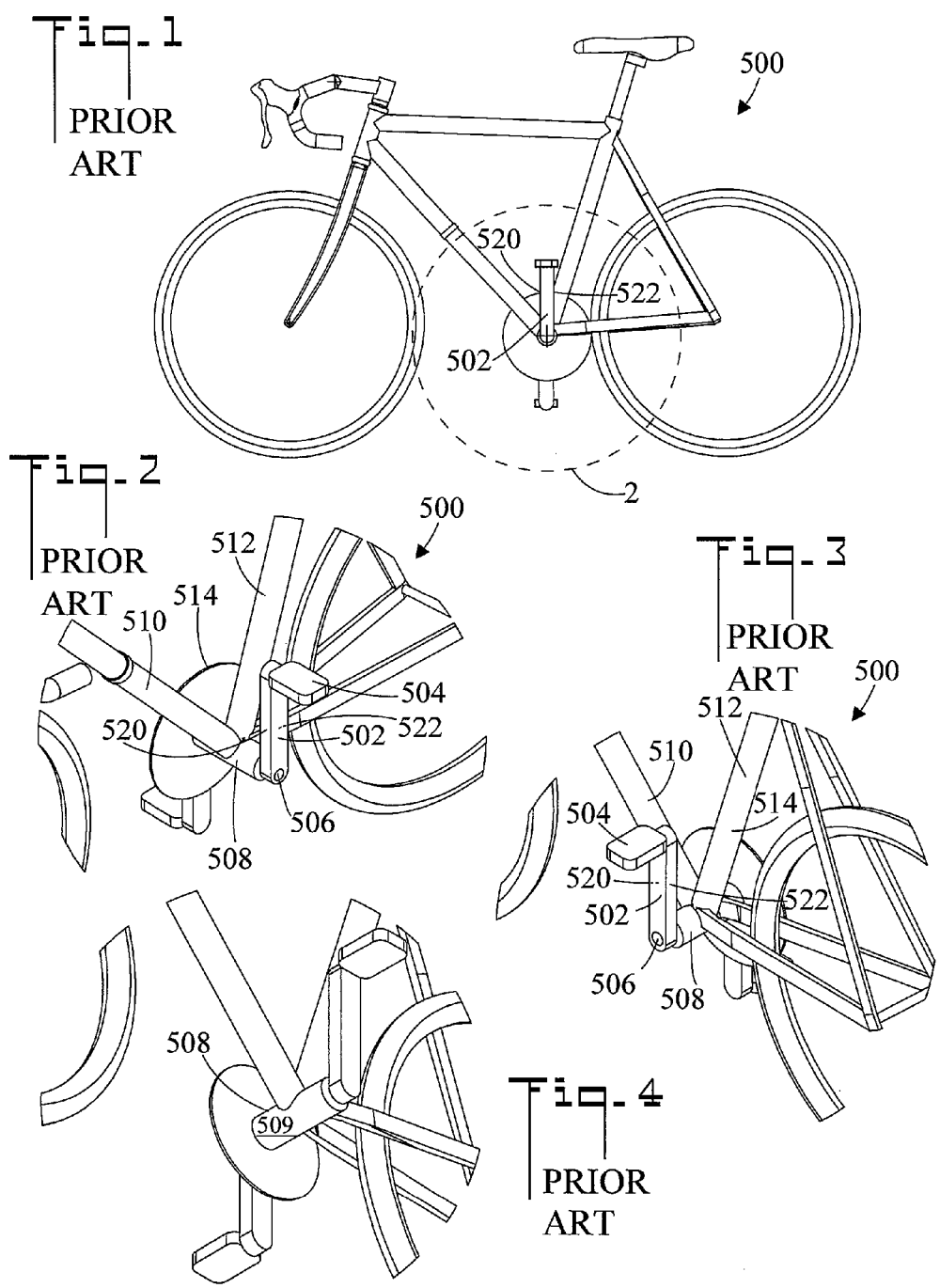

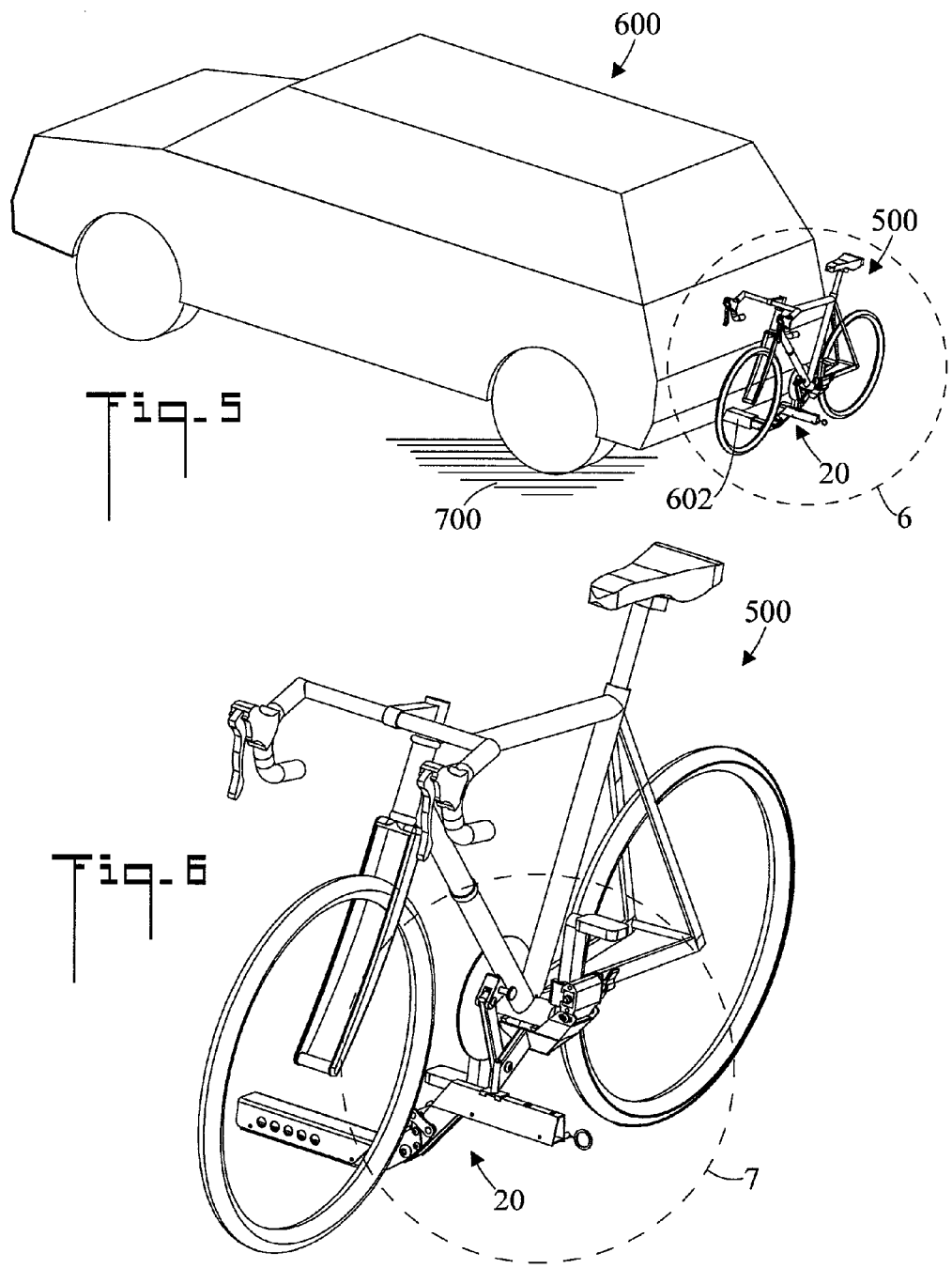

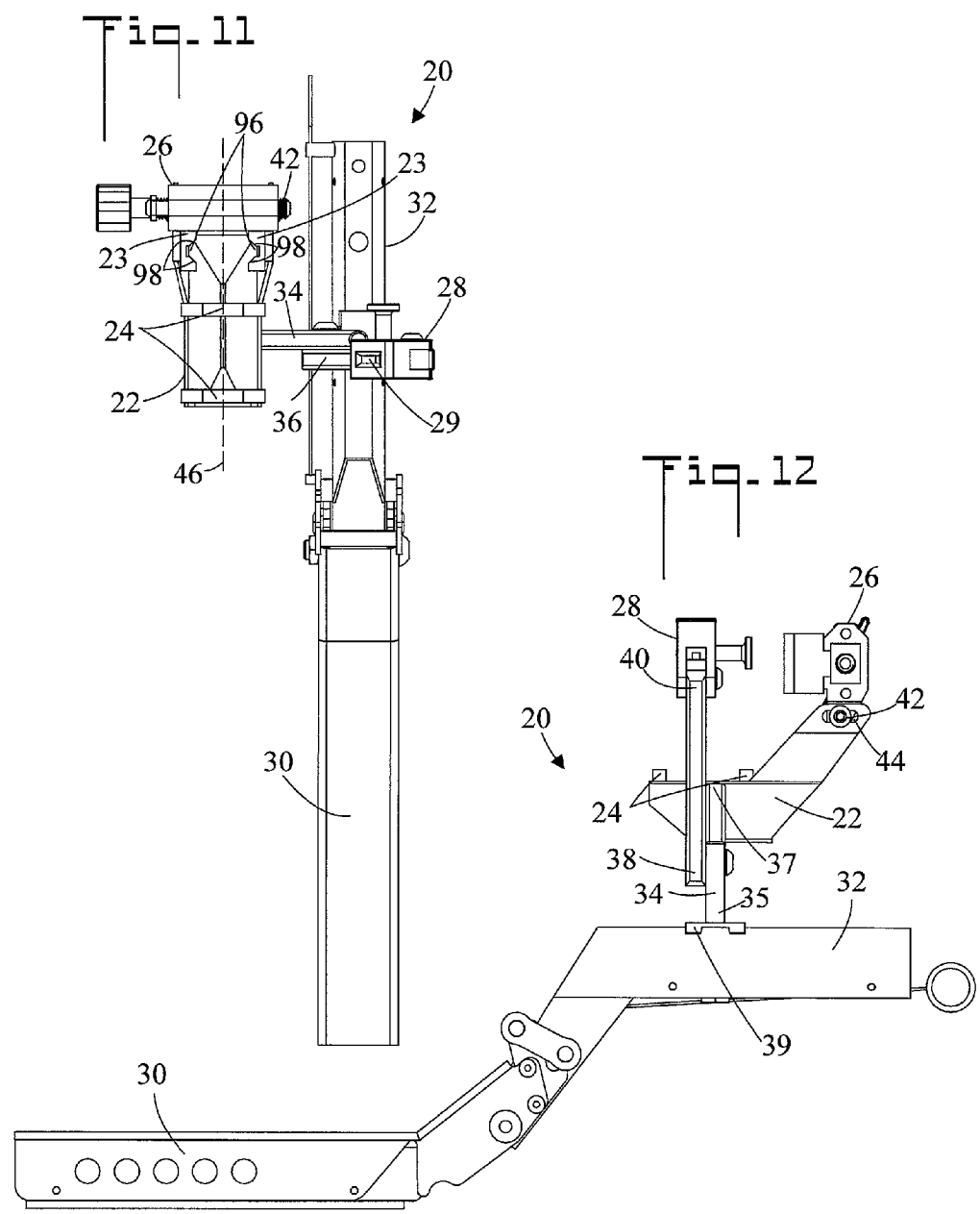

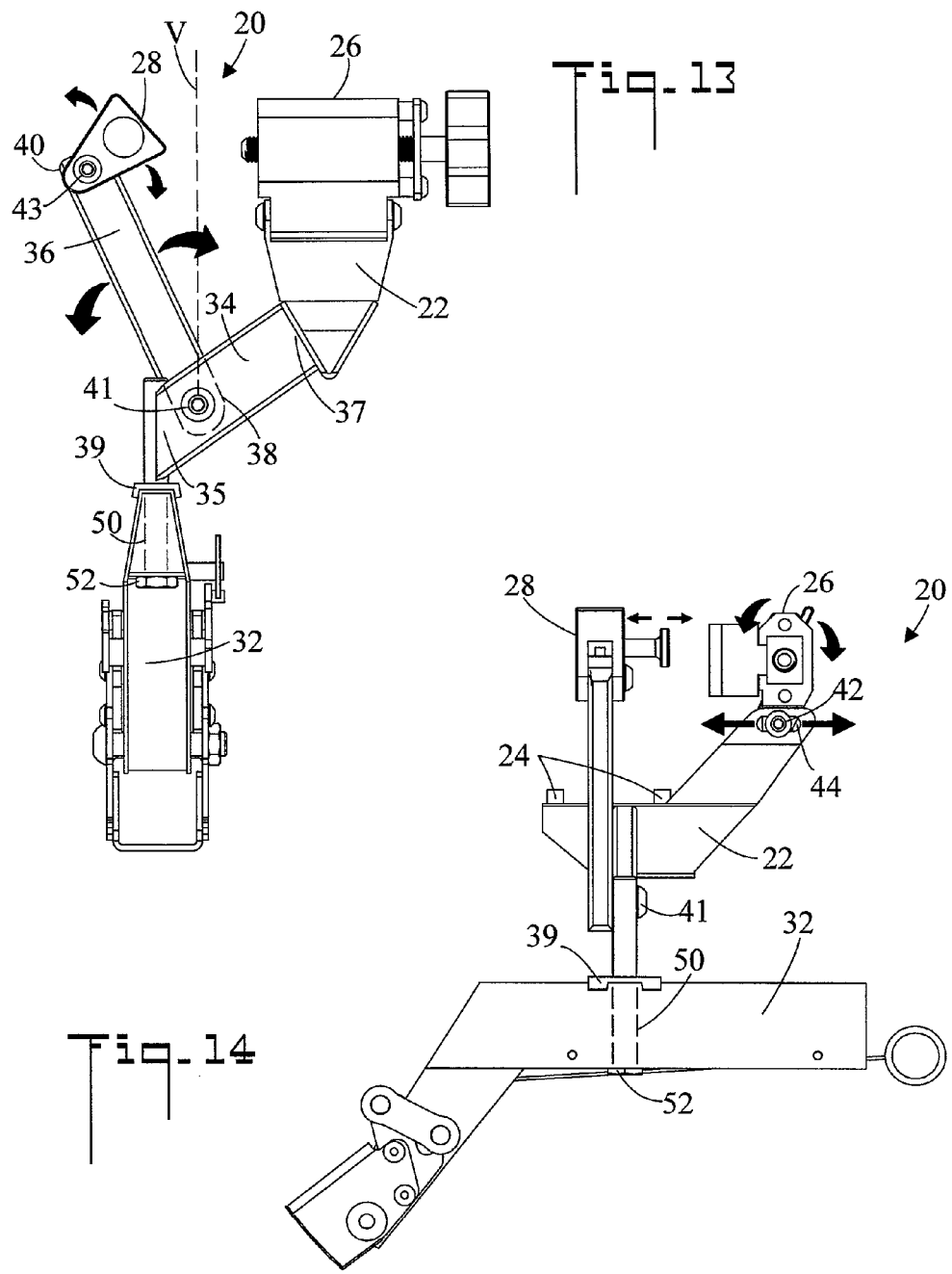

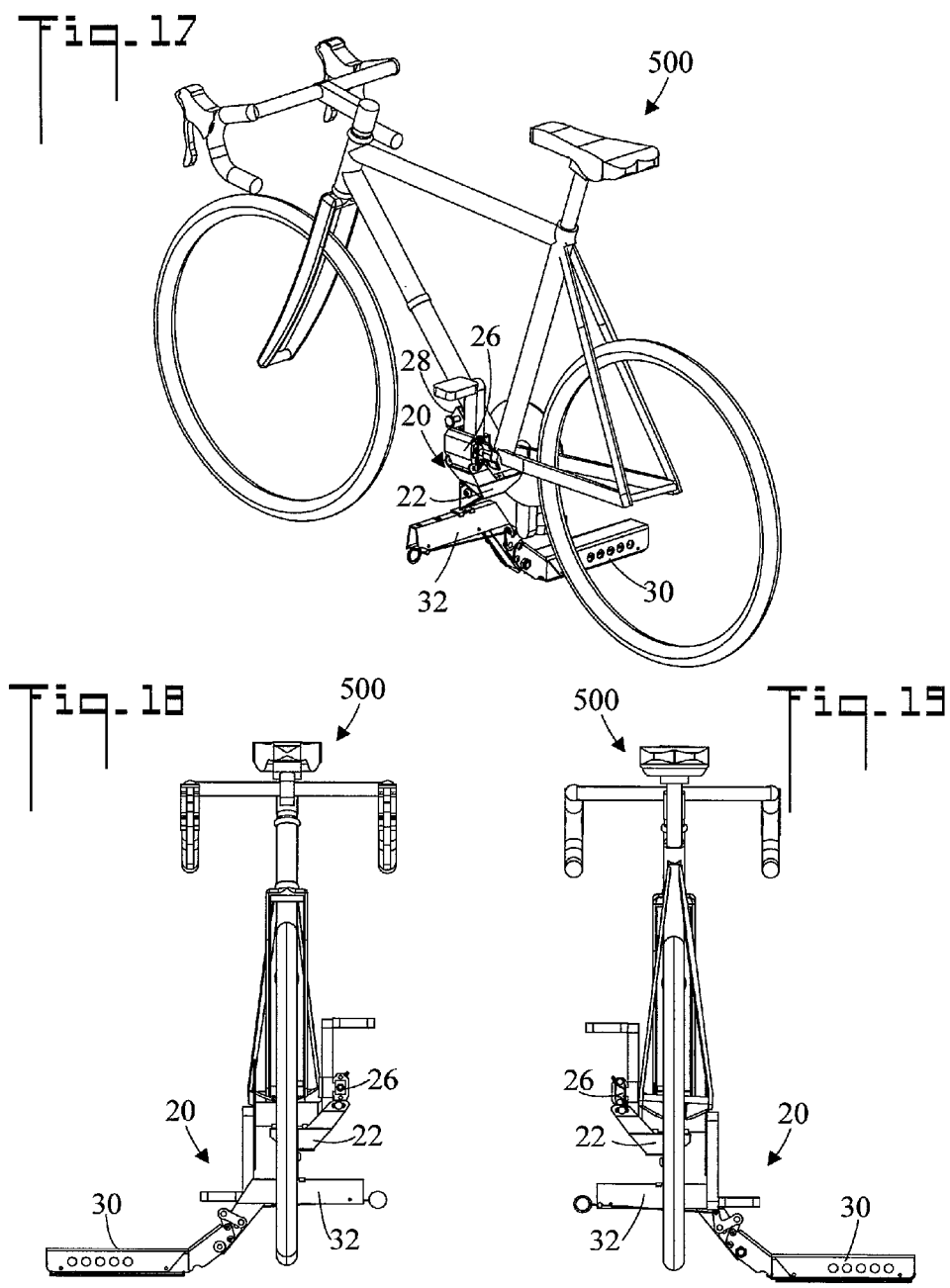

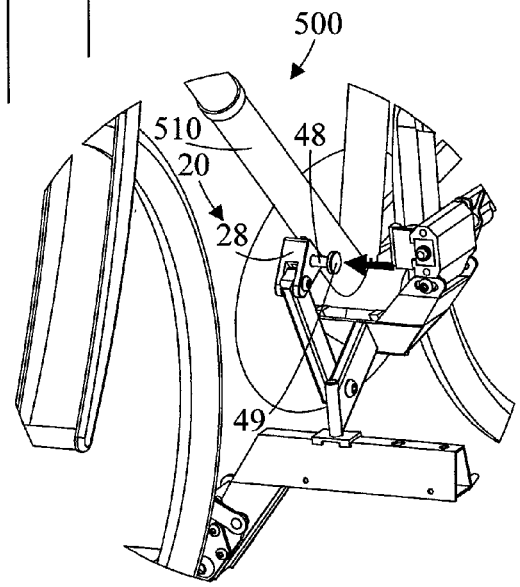
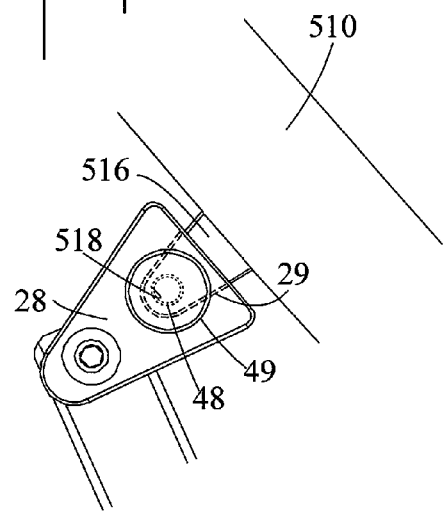
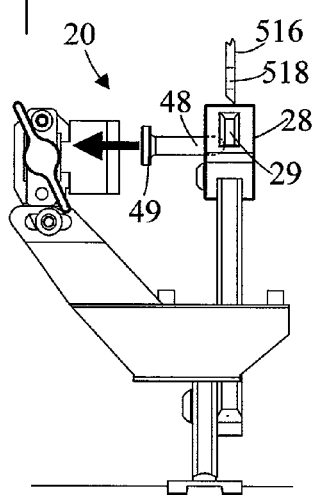
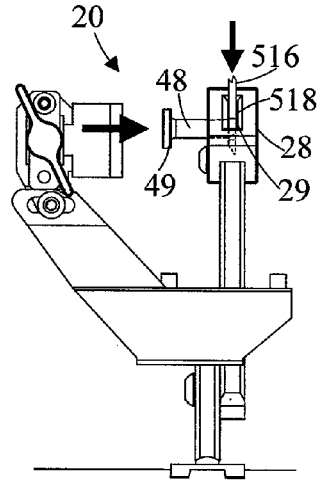

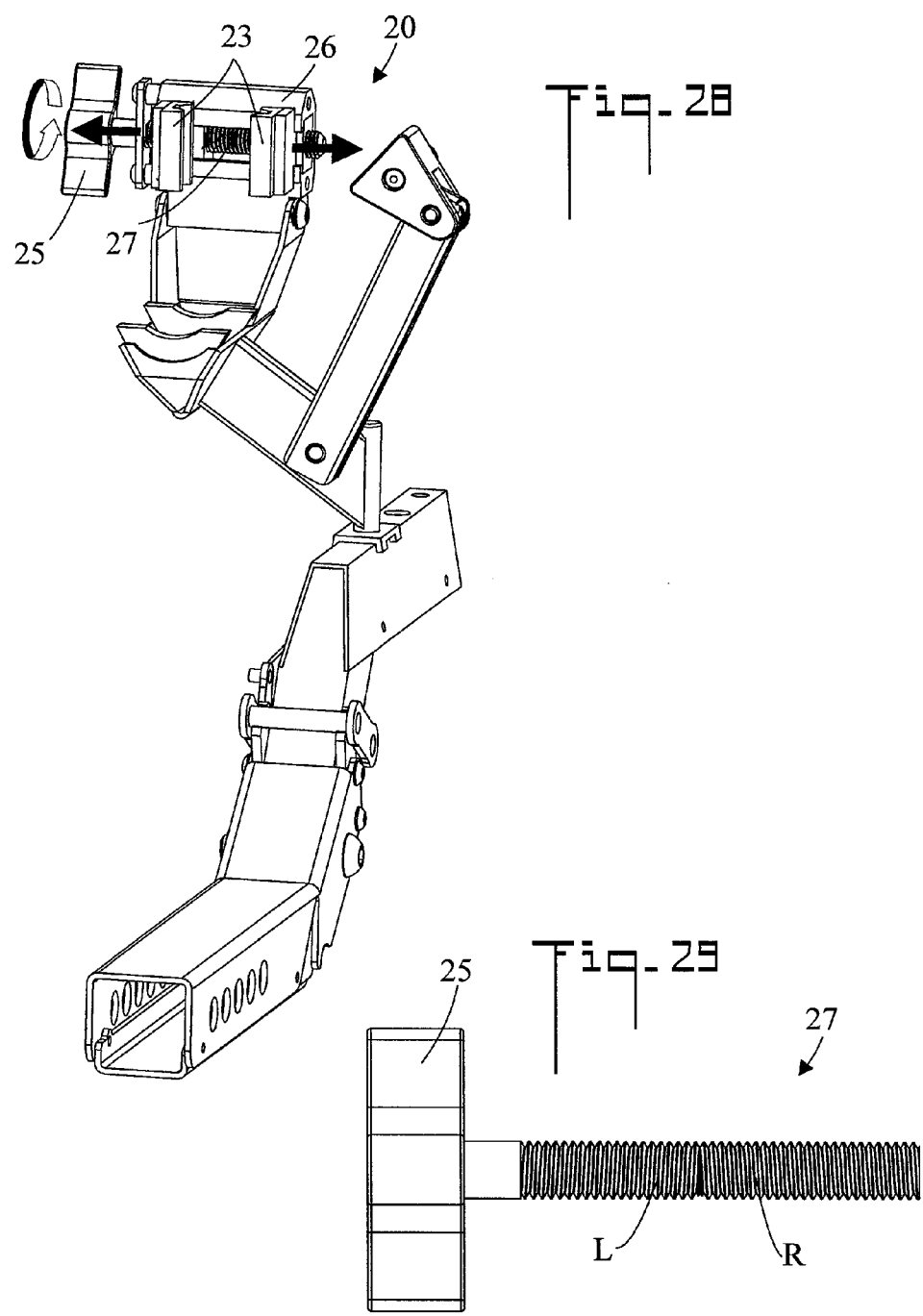

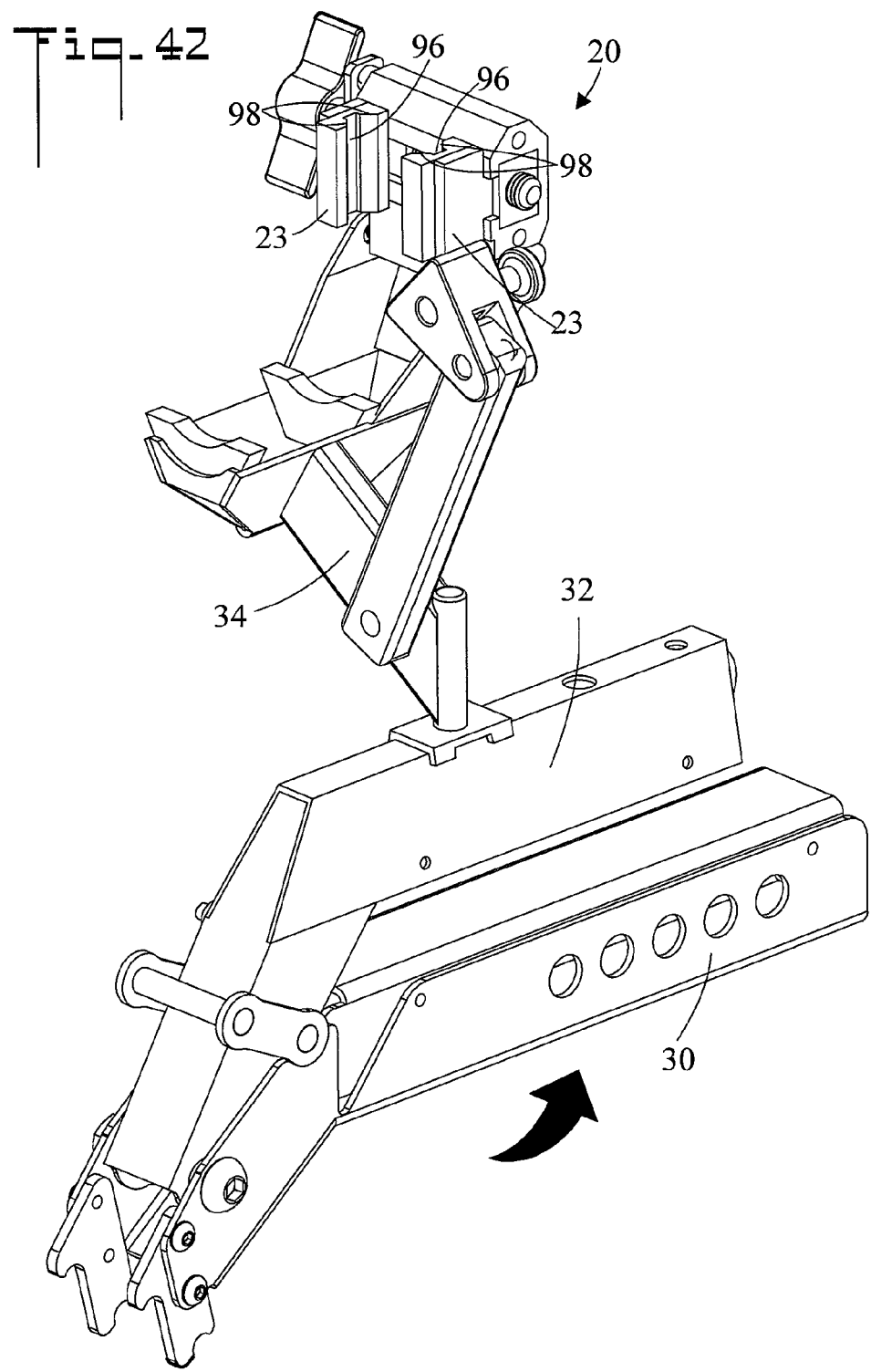

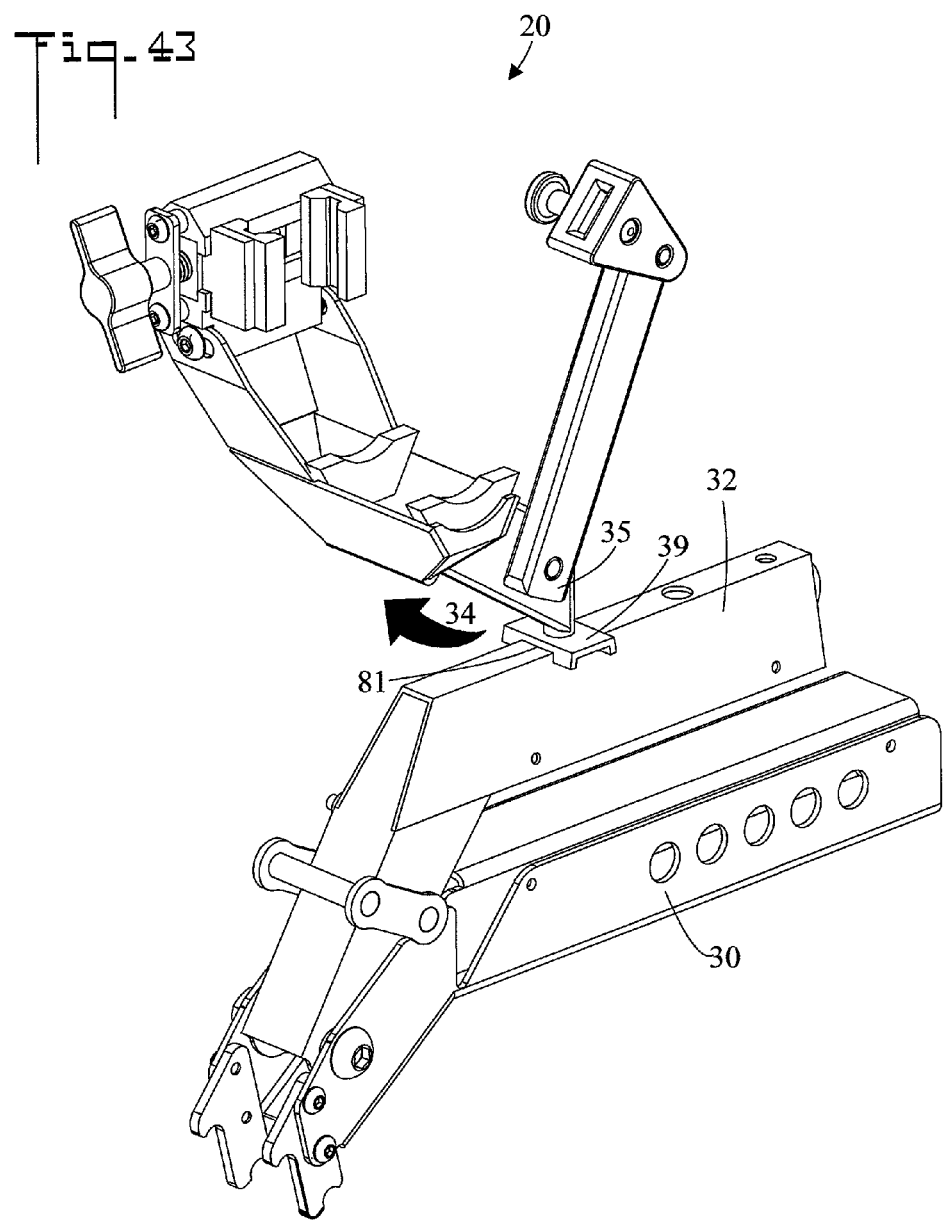

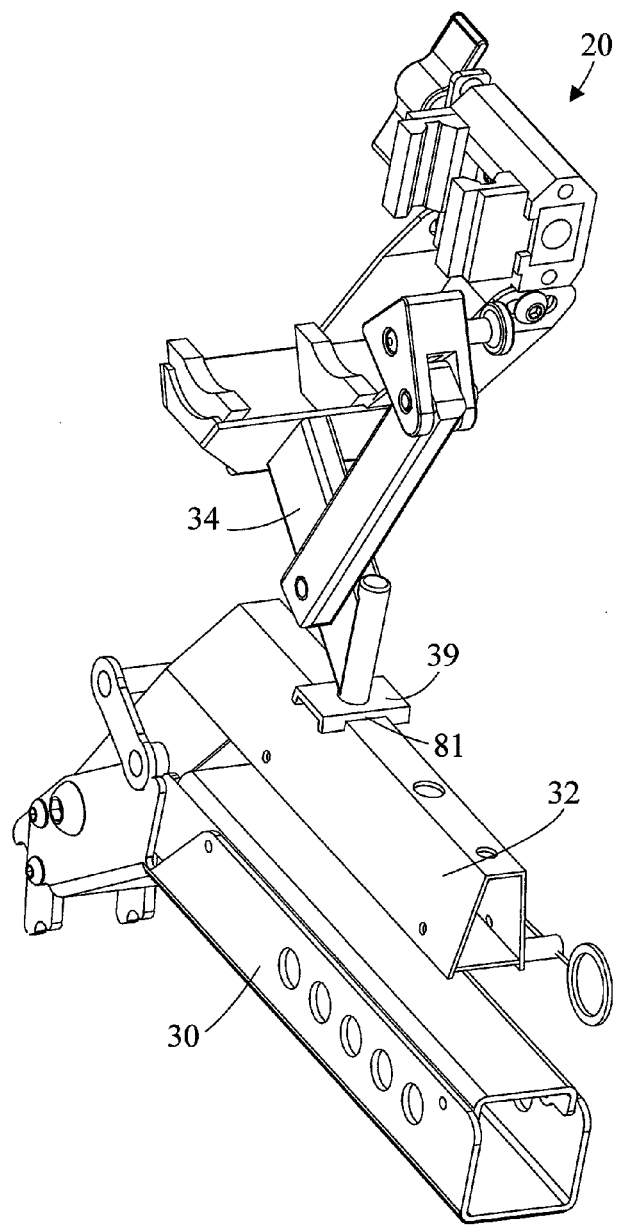

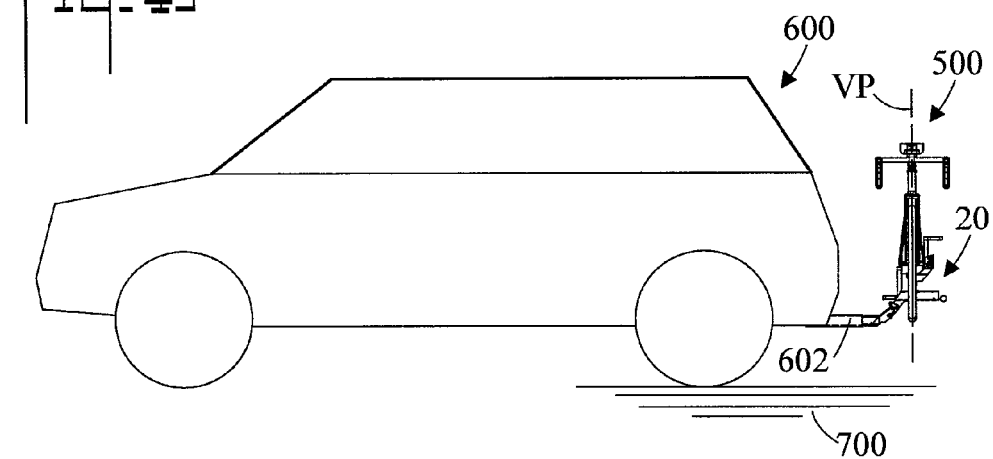
Fig_45
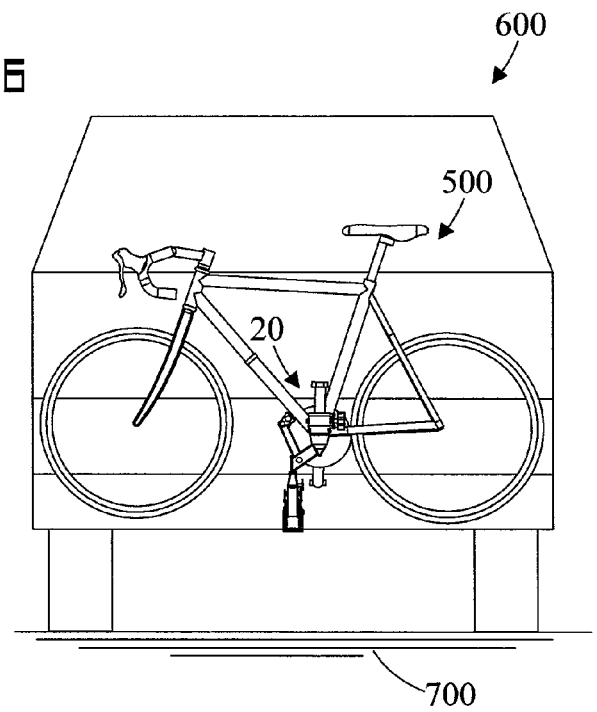
Fig_46

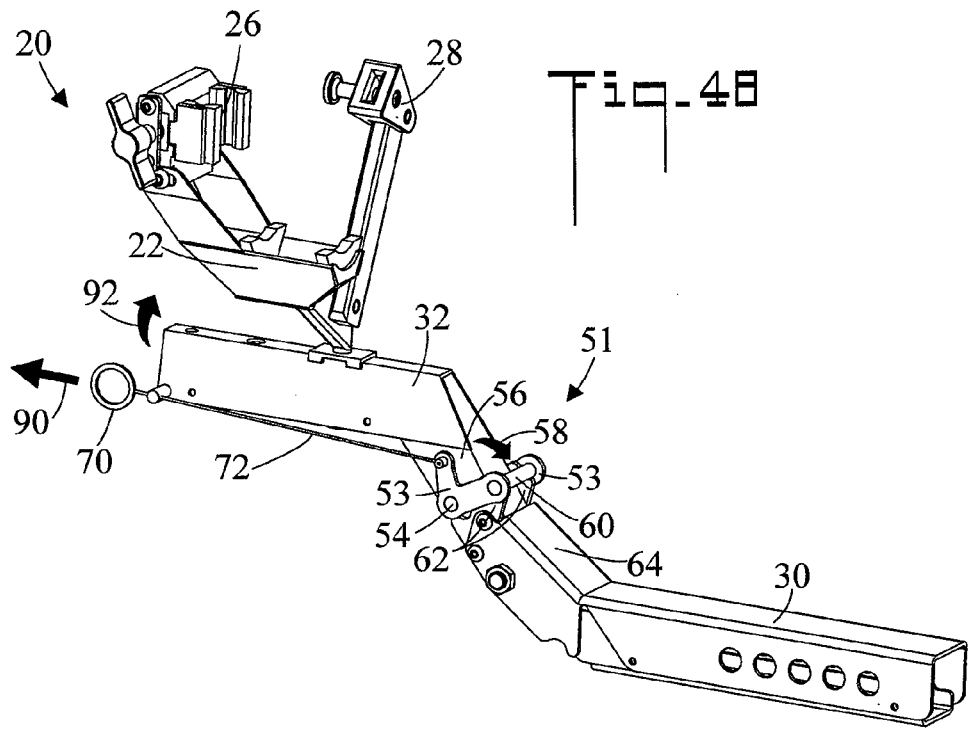
Fig_48
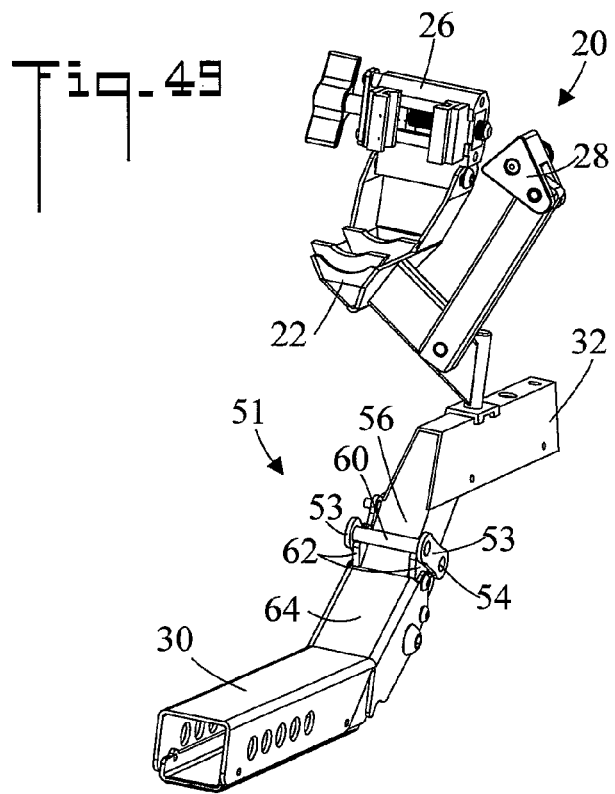
Fig_49

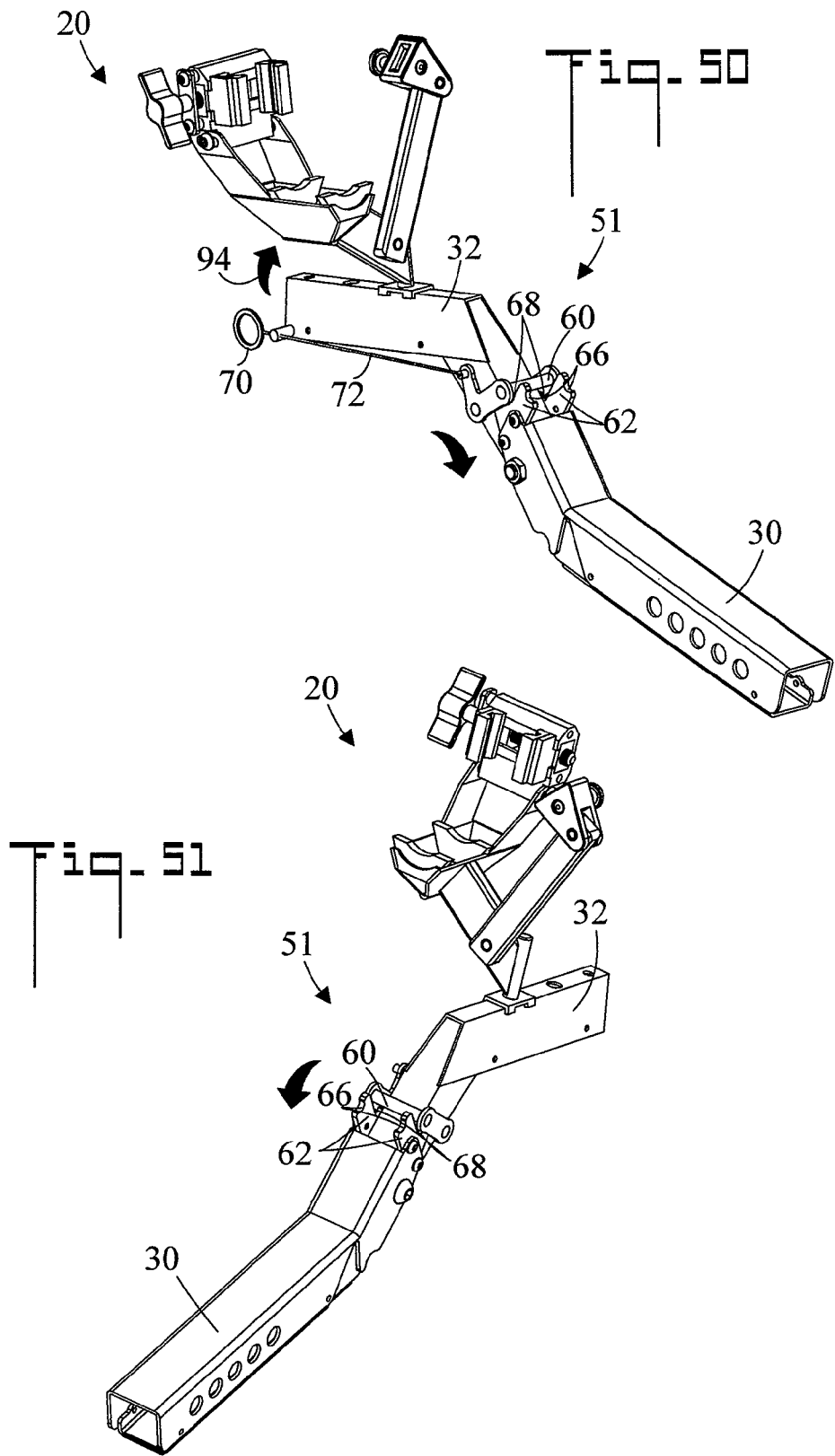

APPARATUS FOR CONNECTING A BICYCLE TO A MOTOR VEHICLE AND METHOD OF USE

CROSS REFERENCE TO RELATED APPLICATION

This application claims the filing benefit under 35 U.S.C. §119(e) of U.S. Provisional Application No. 61/958,423, filed Jul. 29, 2013, which is hereby incorporated by reference.

TECHNICAL FIELD

The present invention pertains generally to bicycles, and more particularly to apparatus for connecting a bicycle to a motor vehicle.

BACKGROUND OF THE INVENTION

A bicycle carrier (also commonly called a bike rack) is a device which attaches to a motor vehicle (such as an automobile, truck, SUV, RV, bus, etc.) for the purpose of transporting a bicycle. Bicycle carriers are typically mounted to the roof, front, or rear of the motor vehicle, and one or more bicycles are then clamped or strapped to the bicycle carrier. One type of carrier mounts to the rear bumper hitch of the vehicle.

BRIEF SUMMARY OF THE INVENTION

The present invention is directed to apparatus and method for connecting a bicycle to a motor vehicle. Three points on the bicycle are supported, the crank axle housing, a crank arm, and the down tube. In an embodiment, the apparatus supports but does not fixedly connect to the crank axle housing, is clamped to the crank arm, and is pinned to the down tube. The apparatus is light and compact, is ridged so that the bicycle does not sway during transportation, is quick and easy to use, and can be placed in in-use, lowered, and folded storage positions.

In accordance with an embodiment, apparatus is disclosed for connecting a bicycle to a motor vehicle, the bicycle having a crank arm, a crank axle housing, and a down tube. The apparatus includes a crank axle housing support which is shaped and dimensioned to receive the crank axle housing of the bicycle. The apparatus also includes a crank arm connector which is connected to the crank axle housing support, the crank arm connector is connectable to the crank arm. The apparatus further includes a down tube connector which is connected to the crank axle housing support, the down tube connector is connectable to the down tube.

In accordance with another embodiment, the crank axle housing support includes two spaced apart rests.

In accordance with another embodiment, the crank arm connector includes a crank arm clamp which removably clamps around the crank arm.

In accordance with another embodiment, the crank arm has a horizontal position and a crank arm angle. The crank arm clamp is horizontally positionable to accommodate various horizontal positions of the crank arm. The crank arm clamp is also angularly rotatable to accommodate various crank arm angles of the crank arm.

In accordance with another embodiment, the crank arm clamp is connected to the crank axle housing support by a pivot member which is positionable in a horizontal slot, so that the crank arm clamp can both rotate and move along the horizontal slot (translate), and be locked in a desired position.

In accordance with another embodiment, the crank axle housing support has a support central axis. When viewed from the top, the crank arm clamp is centered upon the support central axis.

In accordance with another embodiment, the crank arm clamp includes a threaded member which has both left and right handed threads.

In accordance with another embodiment, the down tube ha a flange with an aperture. The down tube connector includes (1) a slot which is shaped and dimensioned to receive the flange of the down tube, and (2) a pin which is shaped and dimensioned to removably engage the aperture of the flange.

In accordance with another embodiment, a down tube connector support arm has a proximal end and an opposite distal end. The proximal end is rotatably connected to the crank axle housing support, and the distal end is rotatably connected to the down tube connector. The down tube connector support arm is rotatable to a desired angular position with respect to vertical and lockable in position. The down tube connector is rotatable to a desired angular position with respect to the down tube connector support arm and lockable in position.

In accordance with another embodiment, the down tube connector is a clamp.

In accordance with another embodiment, the apparatus includes a bicycle support beam. A support arm has a proximal end which is rotatably connected to the bicycle support beam, and a distal end which is connected to the crank axle housing support. The support arm is rotatable to an in-use position perpendicular to the bicycle support beam and to a storage position parallel to the bicycle support beam.

In accordance with another embodiment, the proximal end of the support arm includes a flange which is rotatable to an in-use position parallel to the bicycle support beam, and to a storage position which is perpendicular to the bicycle support beam.

In accordance with another embodiment, the apparatus includes a bicycle support beam extension which is shaped and dimensioned to longitudinally connect to the bicycle support beam, thereby allowing additional bicycles to be carried by the apparatus.

In accordance with another embodiment, the apparatus includes a hitch insertion beam which is rotatably connected to the bicycle support beam. In an in-use position the hitch insertion beam is disposed parallel to the bicycle support beam wherein the bicycle support beam extends outwardly from the hitch insertion beam. The hitch insertion beam is rotatable to a storage position parallel to the bicycle support beam, wherein the hitch insertion beam is folded back toward the bicycle support beam.

In accordance with another embodiment, the apparatus includes a locking mechanism for locking the bicycle support beam in one of (1) an in-use position, and (2) a lowered position. The locking mechanism includes a cross beam, two in-use notches, and two lowered notches. Wherein in the in-use position the cross beam resides in the two in-use notches, and in the lowered position the cross beam resides in the two lowered notches.

In accordance with another embodiment, the apparatus includes a pull ring and cable for disengaging the cross beam from either the two in-use notches or the two lowered notches.

Other embodiments, in addition to the embodiments enumerated above, will become apparent from the following detailed description, taken in conjunction with the accompanying drawings, which illustrate, by way of example, the principles of the apparatus and method of use.

BRIEF DESCRIPTION OF THE DRAWINGS

FIG. 1 is a left side elevation view of a prior art bicycle;

FIG. 2 is an enlarged front perspective view of area 2 of FIG. 1;

FIG. 3 is an enlarged rear perspective view of area 2 of FIG. 1;

FIG. 4 is an enlarged fragmented bottom perspective view of a crank axle housing;

FIG. 5 is a reduced perspective view of a motor vehicle, a bicycle, and apparatus for connecting the bicycle to the motor vehicle;

FIG. 6 is an enlarged view of area 6 of FIG. 5;

FIG. 11 is an enlarged top plan view of the apparatus;

FIG. 12 is an enlarged front elevation view of the apparatus;

FIG. 13 is an enlarged side elevation view showing adjustments which can be made to the apparatus;

FIG. 14 is an enlarged fragmented front elevation view showing additional adjustments which can be made to the apparatus;

FIG. 17 is a left rear perspective view of the apparatus and bicycle;

FIG. 18 is a front elevation view of the apparatus and bicycle;

FIG. 19 is a rear elevation view of the system and bicycle;

FIG. 22 is an enlarged fragmented left front perspective view of the apparatus and bicycle with the down tube connector connected;

FIG. 23 is and enlarged fragmented left side elevation view of the down tube connector connected to the bicycle.

FIG. 24 is an enlarged fragmented rear elevation view of the apparatus showing the down tube connector in a disengaged position;

FIG. 25 is an enlarged fragmented rear elevation view of the apparatus showing the down tube connector in an engaged position connected to the bicycle;

FIG. 28 is an enlarged right side perspective view showing the crank arm clamp;

FIG. 29 is an enlarged side elevation view of threaded member having both right and left handed threads;

FIG. 42 is an enlarged perspective view of the apparatus in a partially folded configuration;

FIG. 43 is an enlarged perspective view of the apparatus in a fully folded configuration;

FIG. 44 is another enlarged perspective view of the apparatus in a fully folded configuration;

FIG. 45 is a reduced side elevation view of the motor vehicle with the apparatus and a bicycle installed;

FIG. 46 is a reduced rear elevation view of the motor vehicle, the apparatus and the bicycle;

FIG. 48 is an enlarged perspective view of a locking mechanism locking the apparatus in an in-use position;

FIG. 49 is another enlarged perspective view of the locking mechanism locking the apparatus in the in-use position;

FIG. 50 is an enlarged perspective view of the locking mechanism locking the apparatus in a lowered position;

FIG. 51 is another enlarged perspective view of the locking mechanism locking the apparatus in the lowered position;

DETAILED DESCRIPTION OF THE INVENTION

Figure 7:
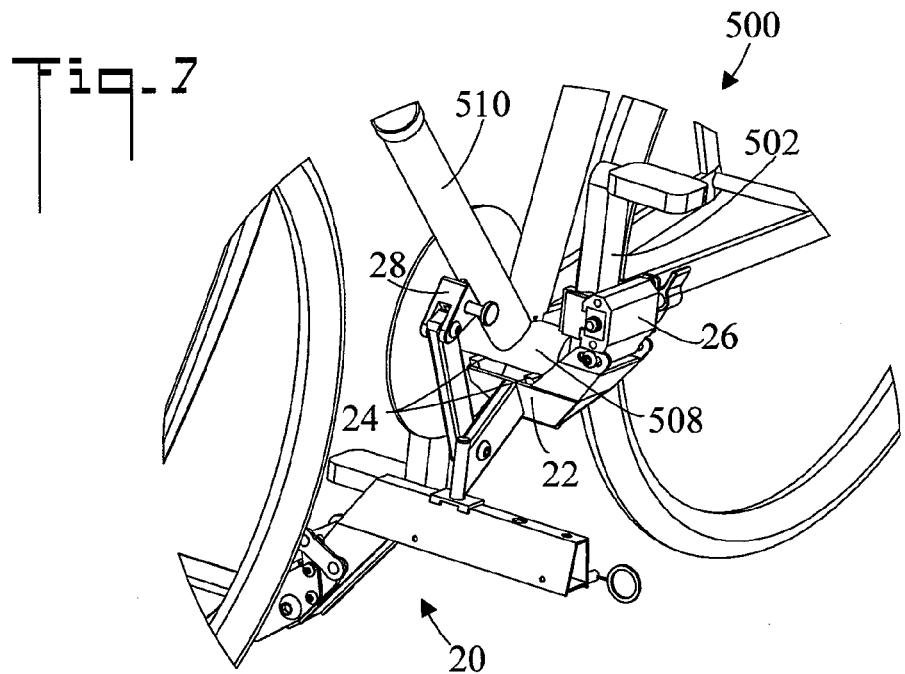
FIG. 7 is an enlarged view of area 7 of FIG. 6.

Referring initially to FIGS. 1-3, there are illustrated left side elevation, enlarged front perspective, and enlarged rear perspective views respectively of a prior art bicycle 500. Bicycle 500 includes a crank arm 502 which carries a pedal 504, a crank axle 506, a crank axle housing 508 (also called a shell or bottom bracket), a down tube 510, and a seat tube 512. Crank axle housing 508 is connected to down tube 510 and seat tube 512. It may be appreciated that another crank arm 502 and pedal 504 are located on the opposite right side of bicycle 500. A chain ring 514 is also located on the right side of bicycle 500. FIG. 4 is an enlarged fragmented bottom perspective view of crank axle housing 508 showing its bottom surface 509 and curved generally cylindrical shape.

Figure 8:
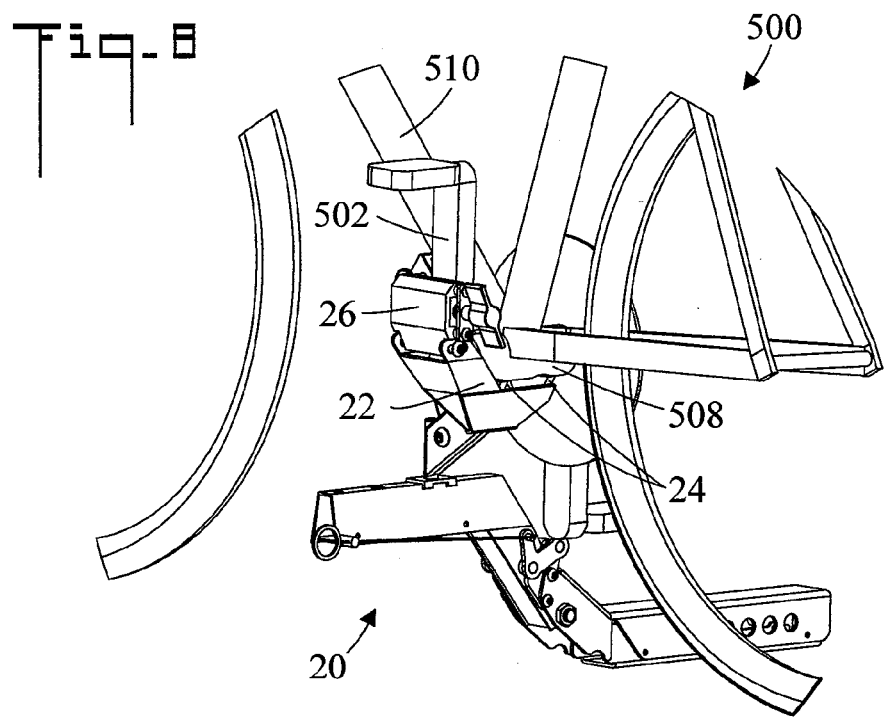
FIG. 8 is an enlarged rear perspective view of area 7 of FIG. 6.
Figure 9:
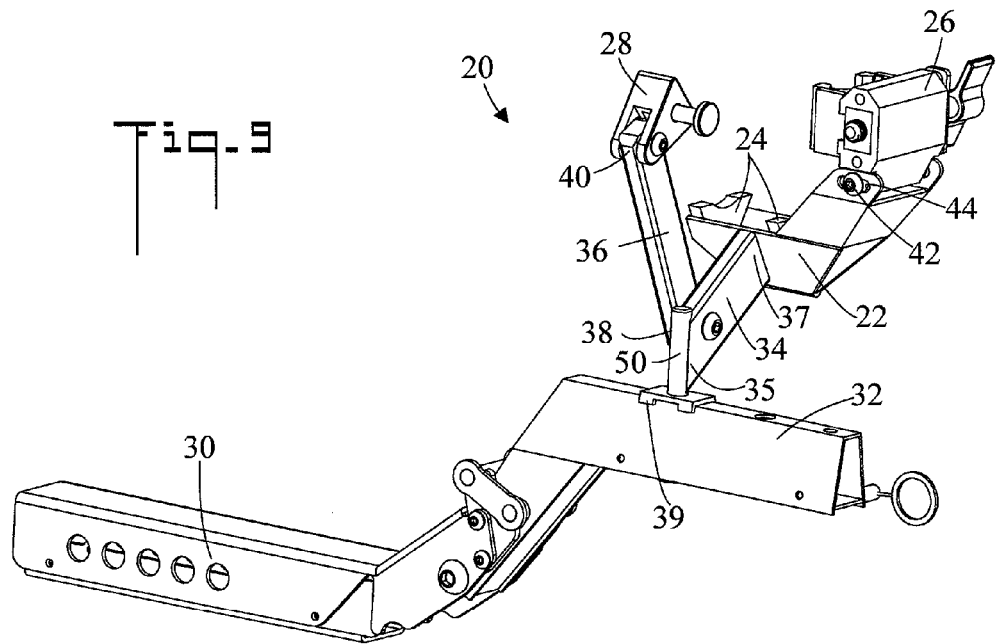
FIG. 9 is an enlarged front perspective view of the apparatus for connecting a bicycle to a motor vehicle.
Figure 10:
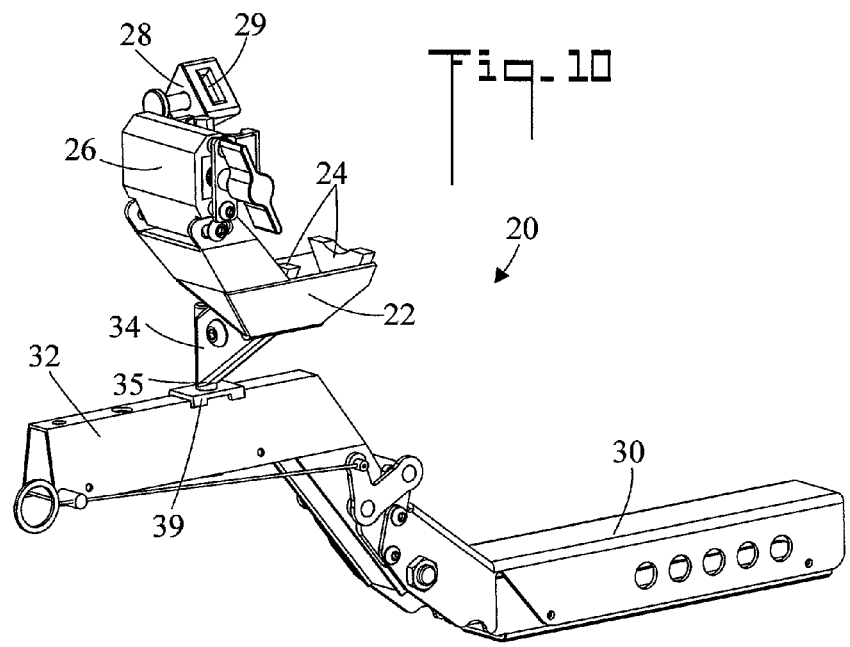
FIG. 10 is an enlarged rear perspective view of the apparatus.
Figure 15:
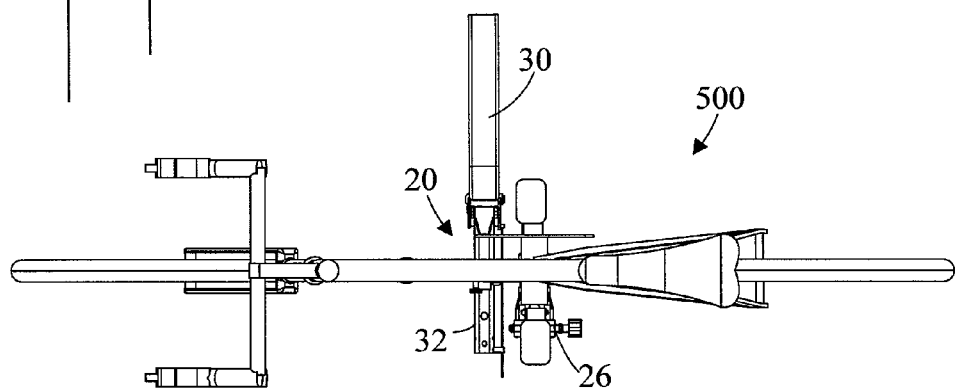
FIG. 15 is a top plan view of the apparatus with a bicycle installed thereon.
Figure 16:
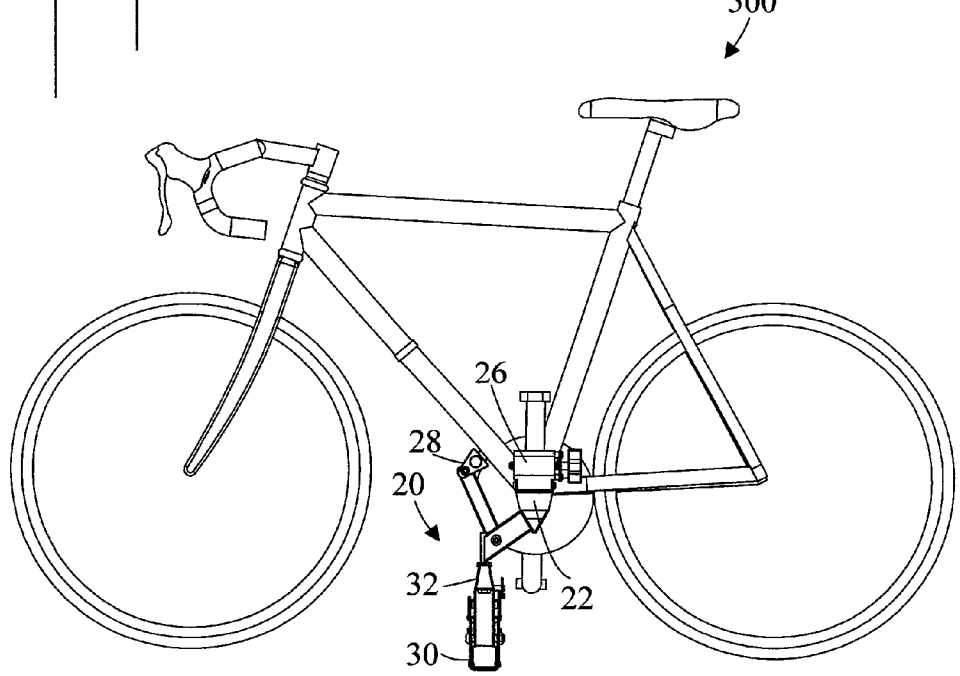
FIG. 16 is a left side elevation view of the apparatus and bicycle.

FIG. 5 is a reduced perspective view of a motor vehicle 600, bicycle 500, and apparatus 20 for connecting bicycle 500 to motor vehicle 600. Motor vehicle 600 is disposed upon a generally horizontal support surface 700 such as a road. FIG. 6 is an enlarged view of area 6 of FIG. 5, FIG. 7 is an enlarged view of area 7 of FIG. 6, and FIG. 8 is an enlarged rear perspective view of area 7 of FIG. 6. Apparatus 20 includes a crank axle housing support 22 which is shaped and dimensioned to receive crank axle housing 508. Crank axle housing support 22 is shaped and dimensioned to receive and support the bottom surface 509 of crank axle housing 508 (refer to FIG. 4). In the shown embodiment, crank axle housing support 22 includes two spaced apart rests 24 which have semicircular grooves to accept and cradle crank axle housing 508 (also refer to FIGS. 9, 10, 12, and 36). In an embodiment, rests 24 are fabricated from a polymer which will support but not mare crank axle housing 508. An ultra-high-molecular weight polyethylene (UHMWPE) has been found effective for this purpose.

Apparatus 20 further includes a crank arm connector which is connected to crank axle housing support 22. The crank arm connector is removably connectable to crank arm 502 of bicycle 500. In the shown embodiment, the crank arm connector is a crank arm clamp 26 which removably clamps around crank arm 502 (also refer to FIGS. 26-33 and the associated discussions).

Apparatus 20 further includes a down tube connector 28 which is connected to crank axle housing support 22 by a support arm 34 and a down tube connector support arm 36 (refer also to FIG. 13). Down tube connector 28 is removably connectable to down tube 510 of bicycle 500 (also refer to FIGS. 20-25 and the associated discussions).

Apparatus 20 further includes a hitch insertion beam 30 which is rotatably connected to a bicycle support beam 32 (also refer to FIG. 42). In the shown in-use position, bicycle support beam 32 is disposed parallel to hitch insertion beam 30 and extends outwardly therefrom. Hitch insertion beam 30 is shaped and dimensioned to be removably received by a receiver tow hitch 602 which is permanently connected to motor vehicle 600 (refer to FIGS. 5, 45, and 47). In the shown embodiment, bicycle support beam 32 is of sufficient length to support two bicycles 500. In the in-use position, both hitch insertion beam 30 and bicycle support beam 32 are substantially horizontal (i.e. parallel the surface 700 which supports motor vehicle 600).

FIGS. 9-12 are enlarged front perspective, rear perspective, top plan, and front elevation views respectively of apparatus 20. And, FIGS. 13 and 14 are enlarged side elevation and front elevation views respectively showing adjustments which can be made to apparatus 20. A support arm 34 connects crank axle housing support 22 to bicycle support beam 32. Support arm 34 has a proximal end 35 which is rotatably connected to bicycle support beam 32, and a distal end 37 which is connected to crank axle housing support 22. Proximal end 35 of support arm 34 includes a flange 39 which is rotatable to an in-use position parallel to bicycle support beam 32 (shown in FIGS. 9-14), and to a storage position which is perpendicular to bicycle support beam 32 (refer to FIGS. 43-44). Referring to FIGS. 13 and 14, it is noted that support arm 34 has an integral outwardly (downwardly as shown) projecting pivot 50 which pivotally engages bicycle support beam 32, and is attached thereto by a nut 52.

A down tube connector support arm 36 has a proximal end 38 and an opposite distal end 40. Proximal end 38 is rotatably connected to crank axle housing support 22 (via support 34 in the shown embodiment), and distal end 40 which is rotatably connected to down tube connector 28. Referring specifically to FIG. 13, down tube connector support arm 36 is rotatable to a desired angular position with respect to vertical V about lockable pivot 41 and can be locked in place. Similarly, down tube connector 28 is rotatable to a desired angular position with respect to down tube connector support arm 36 about pivot 43 and can be locked in place. This feature allows down tube connector 28 to be adjusted to accommodate different style and size bicycles 500. In an embodiment lockable pivots 41 and 43 are screws which can be loosened to allow angular movement, and then tightened to lock the connected members together.

Referring specifically to FIG. 14, crank arm clamp 26 is connected to crank axle housing support 22 by a lockable pivot 42 which is positionable in a horizontal slot 44, so that crank arm clamp 26 can both rotate about pivot 42 and move along horizontal slot 44, and be locked in a desired position (also refer to FIGS. 30-33 and the associated discussions). In an embodiment lockable pivot 42 is a screws which can be loosened to allow angular movement and linear translation, and then tightened to lock the crank arm clamp 26 in place. This feature allows crank arm clamp 26 to be adjusted to accommodate different style and size bicycles 500 (refer also to FIGS. 30-33 and the associated discussions). It is noted that as used herein the terms "horizontal" and "vertical" refer to the in-use position of apparatus as depicted in FIG. 5.

Referring specifically to FIG. 11, crank axle housing support 22 has a support central axis 46. When viewed from the top, crank arm clamp 26 is centered upon support central axis 46. This design assures that apparatus 20 will always align with crank axle housing 508 and crank arm 502 (refer to FIGS. 2 and 3).

It is noted that all the components above bicycle support beam 32 (i.e. crank axle housing support 22, crank arm clamp 26, down tube connector 28, and support arm 34) comprise a bicycle support assembly which supports one bicycle 500. In order to support another bicycle 500, a second bicycle support assembly is connected to bicycle support beam 32. Also it is noted that bicycle support beam 32 is rotatably connected to hitch insertion beam 30, and automatically locks in the shown extended in-use position parallel to hitch insertion beam 30.

FIGS. 15-19 are top plan, left side elevation, left rear perspective, front elevation, and rear elevation views respectively of apparatus 20 with a bicycle 500 installed thereon. Shown are crank axle housing support 22, crank arm clamp 26, down tube connector 28, hitch insertion beam 30, and bicycle support beam 32.

Figure 20:
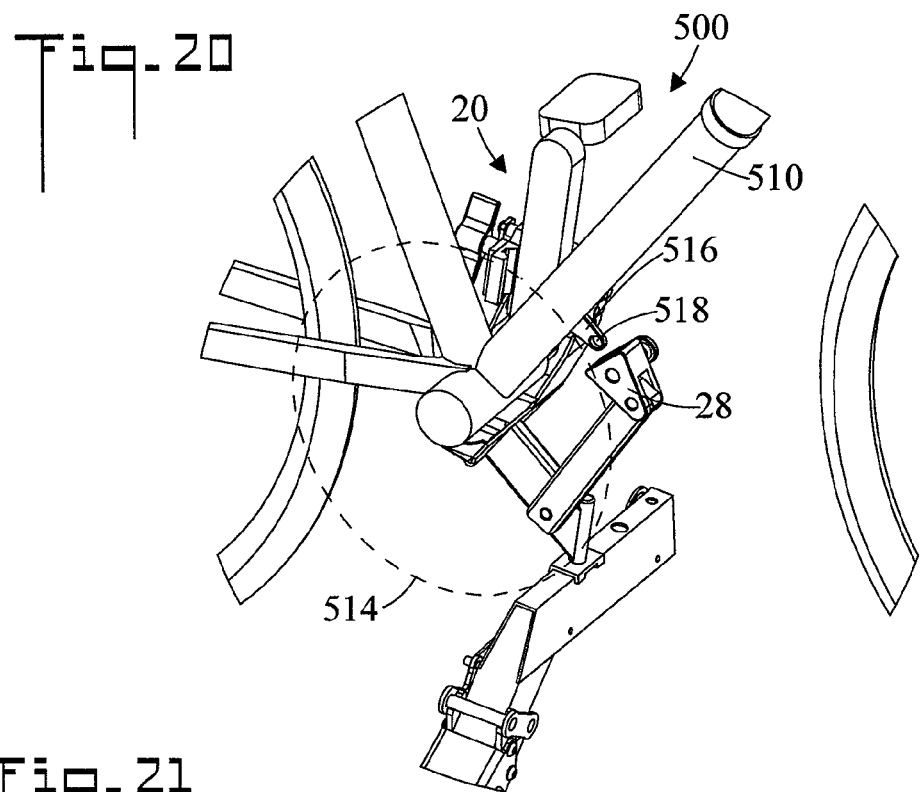
FIG. 20 is an enlarged fragmented right front perspective view of the apparatus and bicycle with a down tube connector ready to be connected.
Figure 21:
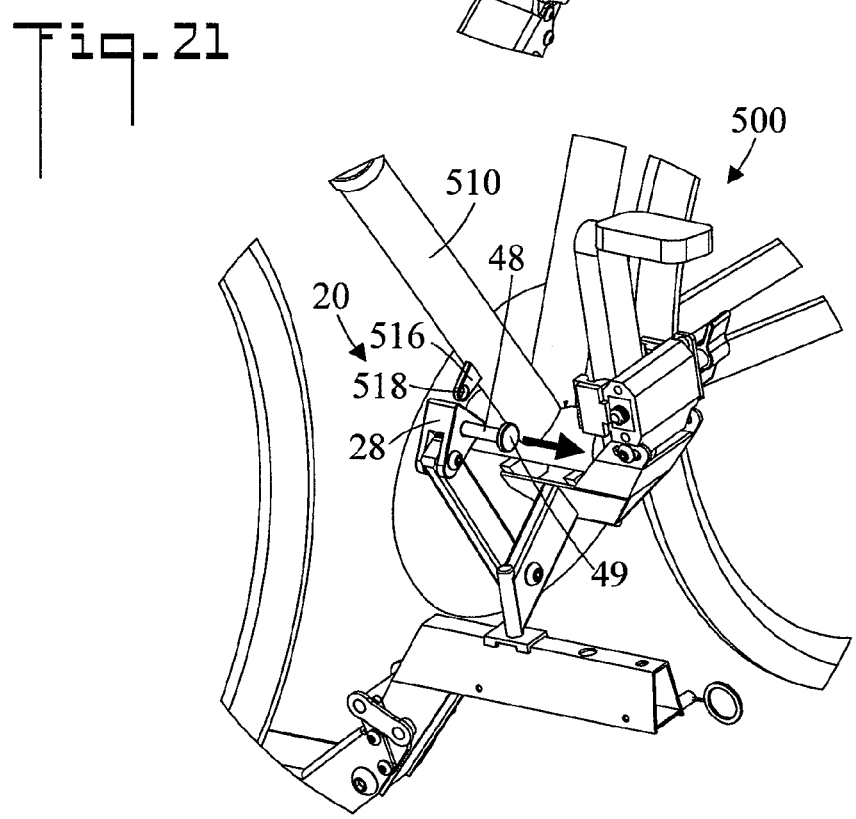
FIG. 21 is an enlarged fragmented left front perspective view of the apparatus and bicycle with the down tube connector ready to be connected.

FIGS. 20 and 21 are enlarged fragmented right and left front perspective views respectively of apparatus 20 and bicycle 500 with down tube connector 28 ready to be connected. It is noted in FIG. 20, and elsewhere herein, chain ring 514 is shown in dashed lines to facilitate the view of bicycle 500 and apparatus 20 components. FIG. 22 is an enlarged fragmented left front perspective view of apparatus 20 and bicycle 500 with down tube connector 28 connected, and FIG. 23 is and enlarged fragmented left side elevation view of down tube connector 28 connected to bicycle 500. And, FIGS. 24 and 25 are enlarged fragmented rear elevation view of apparatus 20 showing down tube connector 28 in a disengaged position and an engaged position respectively.

In the shown embodiment down tube 510 has a flange 516 which has an aperture 518. Flange 518 can be can be welded to down tube 510, or otherwise connected such as with straps, clamps, or the like. In the shown embodiment, down tube connector 28 includes a slot 29 which is shaped and dimensioned to removably receive flange 516 of down tube 510 (refer also to FIGS. 10, 11, 24 and 25). Down tube connector 28 also includes a pin 48 which is shaped and dimensioned to removably engage aperture 518 of flange 516. In FIGS. 20, 21, and 24 pin 48 is moved to a disengaged position there by allowing flange 516 to enter slot 29 of down tube connector 28. In FIGS. 22, 23, and 25, once flange 516 has been inserted into slot 29, pin 48 is moved to an engaged position wherein it goes through aperture 518 thereby connecting flange 516 and down tube connector 28 together. In an embodiment, pin 48 is spring loaded to the engaged (inward) position. In this embodiment, the end of pin 48 is rounded as shown in FIGS. 24, and 53-56 so that when flange 516 is inserted into slot 29 pin 48 will be initially forced by flange 516 to the disengaged (outward) position until aperture 518 aligns with pin 48, wherein the spring loading will force pin through aperture 518 and connect flange 516 to down tube connector 28 (refer also to FIGS. 53-56 and the associated discussions). The spring loading feature makes it unnecessary for the user to pull pin 48 out to the disengaged position when effecting the connection of bicycle 500 to apparatus 20. It is noted that pin 48 has a flared end 49 which facilitates pulling pin 48 out to disengage flange 516.

Figure 26:
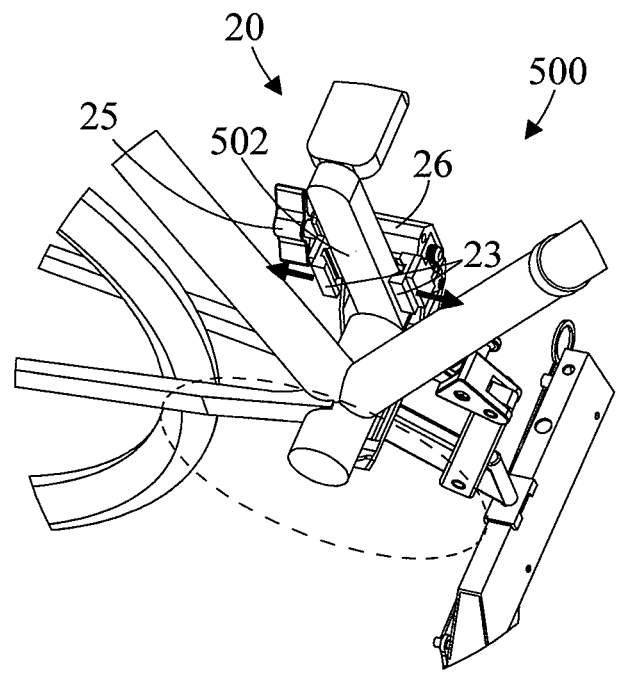
FIG. 26 is an enlarged fragmented right side perspective view of the apparatus showing a crank arm clamp in a disengaged position.
Figure 27:
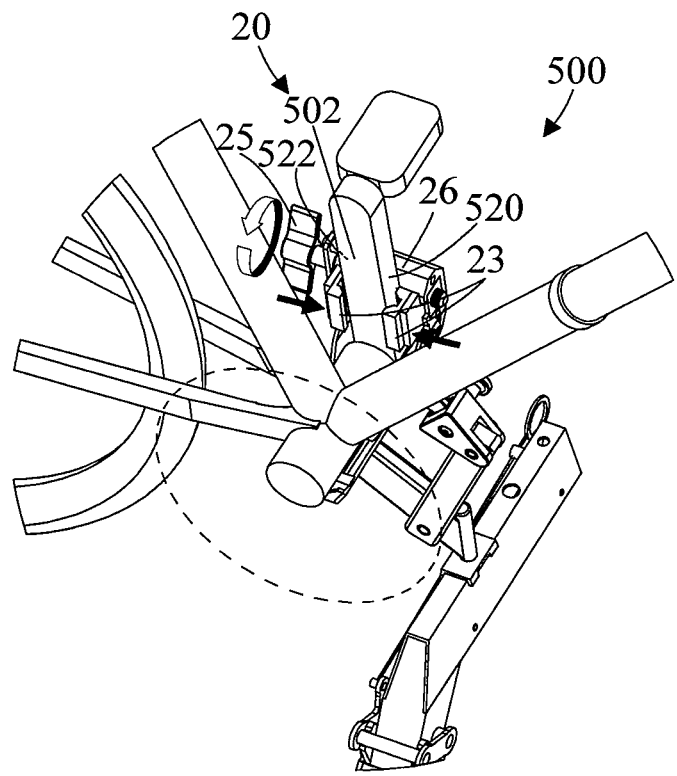
FIG. 27 is an enlarged fragmented right side perspective view of the apparatus showing the crank arm clamp in an engaged position connected to the crank arm of the bicycle.

FIG. 26 is an enlarged fragmented right side perspective view of apparatus 20 showing the crank arm connector in a disengaged position, and FIG. 27 is an enlarged fragmented right side perspective view of apparatus 20 showing the crank arm connector in an engaged position connected to crank arm 502 of bicycle 500. In the shown embodiment, crank arm connector is a crank arm clamp 26 which removably clamps to crank arm 502. FIG. 28 is an enlarged right side perspective view showing crank arm clamp 26, and FIG. 29 is an enlarged side elevation view of threaded member 27 having both right R and left L handed threads. Crank arm clamp 26 includes two jaws 23, and a rotating handle 25 which is used to open (FIG. 26) and close (FIG. 27) the jaws 23. In and embodiment, jaws 23 are fabricated from a polymer which will not mare crank arm 502 (e.g. a UHMWPE). In the shown embodiment, crank arm clamp 26 further includes a threaded member 27 connected to handle 25. Threaded member 27 has both left handed L and right handed R threads (refer also to FIG. 29). One jaw 23 is threadably engaged by the left handed L threads, and the other jaw 23 is threadably engaged by the right handed R threads. Because of the left and right handed threads, jaws 23 symmetrically travel away from each other when handle 25 is turned to open the jaws, and symmetrically travel toward each other when handle 25 is turned to close the jaws. This feature keeps the jaws centered on crank arm 502. In FIGS. 1, 2, and 3 it is noted that crank arm 502 has a front side 520 and an opposite rear side 522. When crank arm 502 is upwardly oriented as shown in FIG. 1, front side 520 faces toward the front of bicycle 500 and rear side 522 faces toward the rear of bicycle 500. As shown in FIG. 27, one of the jaws 23 contacts front side 520 of the crank arm 502, and the other jaw 23 contacts rear side 522 of the crank arm 502. In the shown embodiment the two jaws 23 only contact the front 520 and rear 522 sides of crank arm 502, and not other parts of crank arm 502.

Moreover, in FIGS. 11 and 42 it is noted that each jaw 23 includes a longitudinal groove 96 which has two outwardly angled sides 98.

Figure 30:
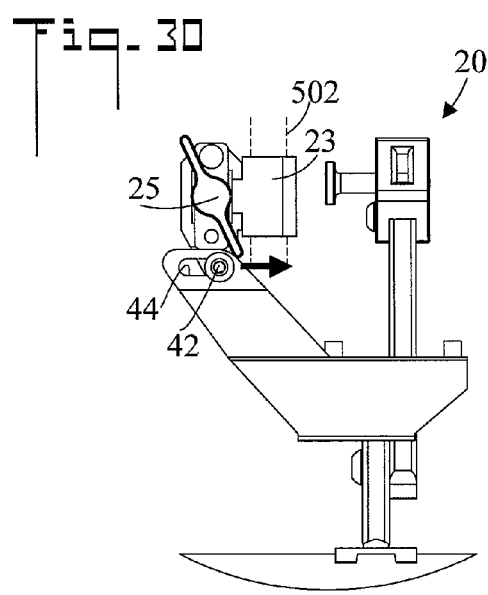
FIG. 30 is an enlarged fragmented rear elevation view of the apparatus showing a horizontal adjustment of the crank arm clamp.
Figure 31:
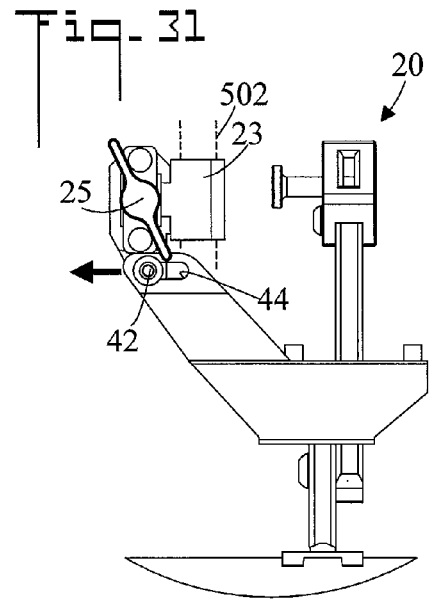
FIG. 31 is an enlarged fragmented rear elevation view of the apparatus showing another horizontal adjustment of the crank arm clamp.

FIGS. 30 and 31 are enlarged fragmented rear elevation views of apparatus 20 showing a horizontal adjustment of crank arm clamp 26. Crank arm 502 has a horizontal position, and crank arm clamp 26 is horizontally positionable to accommodate various positions of crank arm 502 which can occur in different style and size bicycles. In FIG. 30 lockable pivot 42 has been loosened and crank arm clamp 26 has been moved to the right in slot 44 to accommodate the horizontal position of crank arm 502. Lockable pivot 42 is then tightened to lock crank arm clamp 26 in place. Similarly, in FIG. 31, lockable pivot 42 has been loosened and crank arm clamp 26 has been moved to the left in slot 44 to accommodate the horizontal position of a different crank arm 502. Lockable pivot 42 is then tightened to lock crank arm clamp 26 in place.

Figure 32:
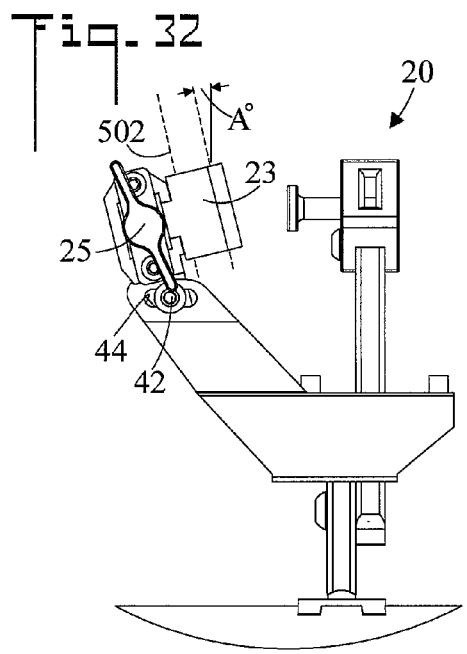
FIG. 32 is an enlarged fragmented rear elevation view of the apparatus showing an angular adjustment of the crank arm clamp.
Figure 33:
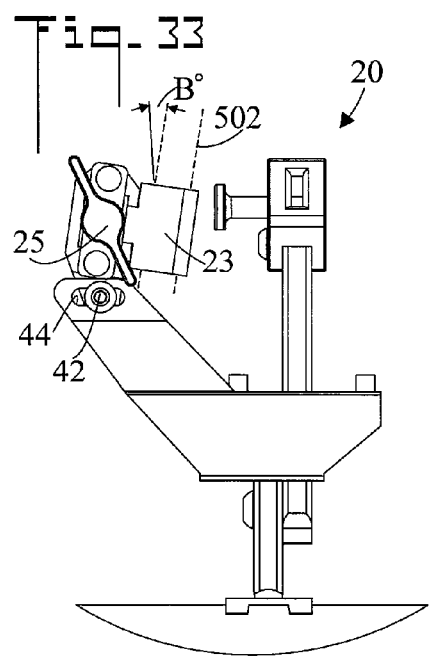
FIG. 33 is an enlarged fragmented rear elevation view of the apparatus showing another angular adjustment of the crank arm clamp.

FIGS. 32 and 33 are enlarged fragmented rear elevation views of apparatus 20 showing an angular adjustment of crank arm clamp 26. Crank arm 502 has a crank arm angle, and crank arm clamp 26 is angularly rotatable to accommodate various crank arm angles of crank arm 502 which can occur in different style and size bicycles. In FIG. 32 lockable pivot 42 has been loosened and crank arm clamp 26 has been rotated so that jaws 23 align with a crank arm 502 angle A (the angle crank arm 502 makes with the vertical). Lockable pivot 42 then tightened to lock crank arm clamp 26 in place. Similarly, in FIG. 33, lockable pivot 42 has been loosened and crank arm clamp 26 has been rotated so that jaws 23 align with a crank arm 502 angle B. Lockable pivot 42 then tightened to lock crank arm clamp 26 in place.

Figure 34:
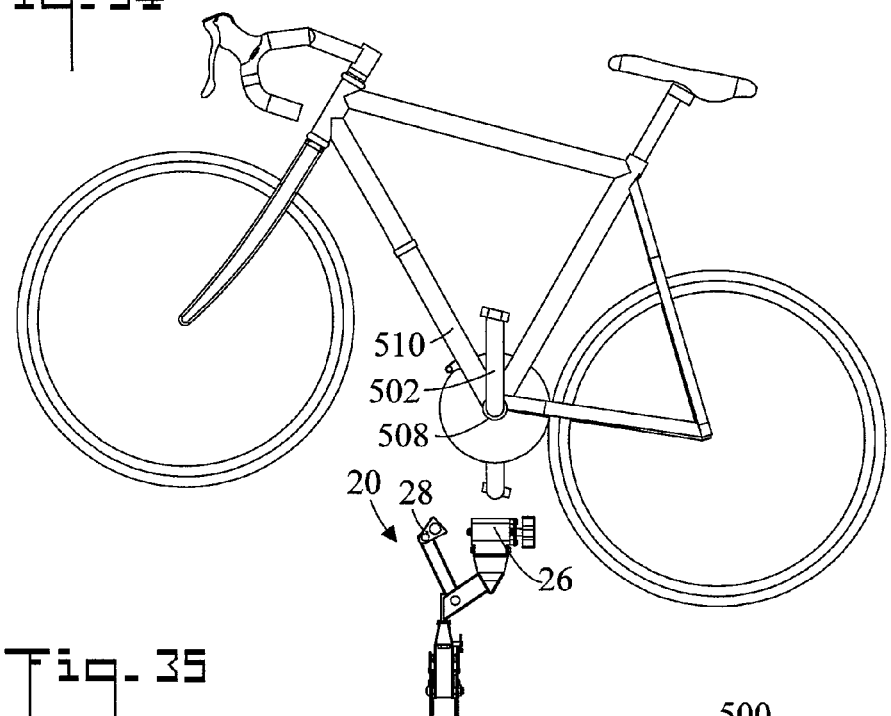
FIG. 34 is a left side elevation view of the bicycle ready for installation in the apparatus.
Figure 35:
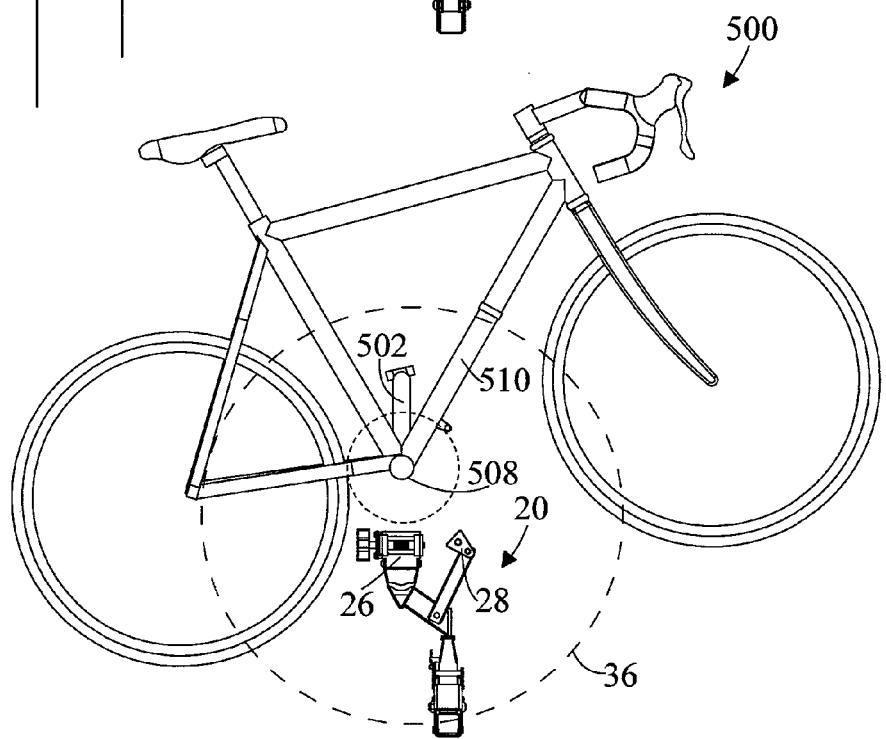
FIG. 35 is a right side elevation view of the bicycle ready for installation in the apparatus.
Figure 36:
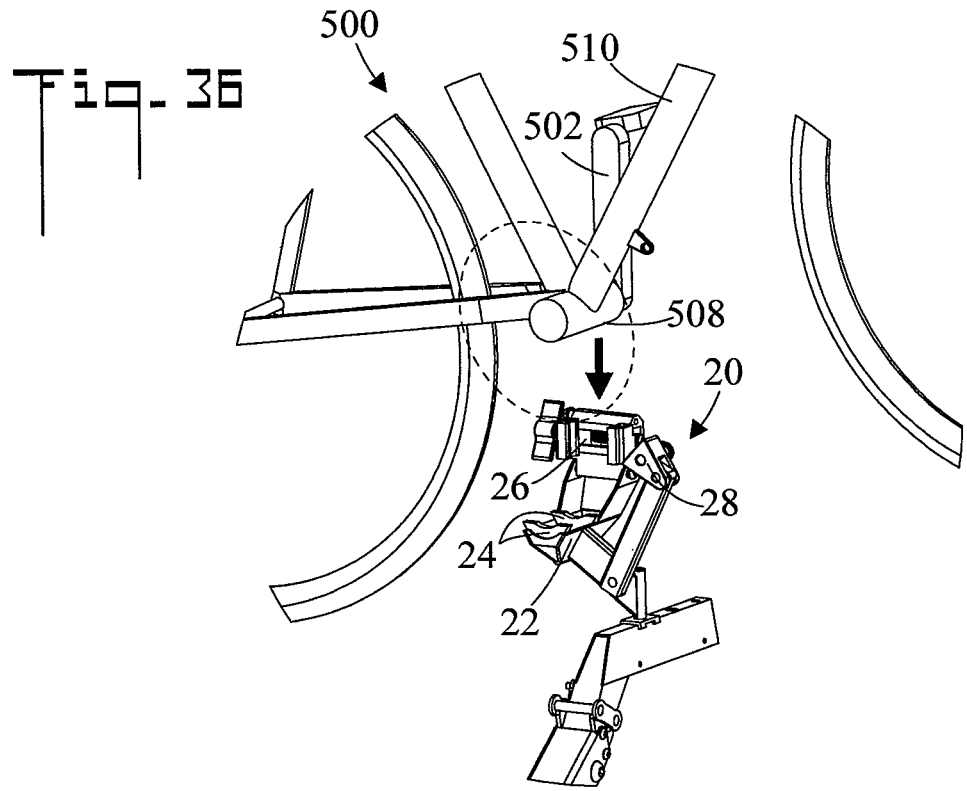
FIG. 36 is an enlarged fragmented right front perspective view of area 36 of FIG. 35.
Figure 37:
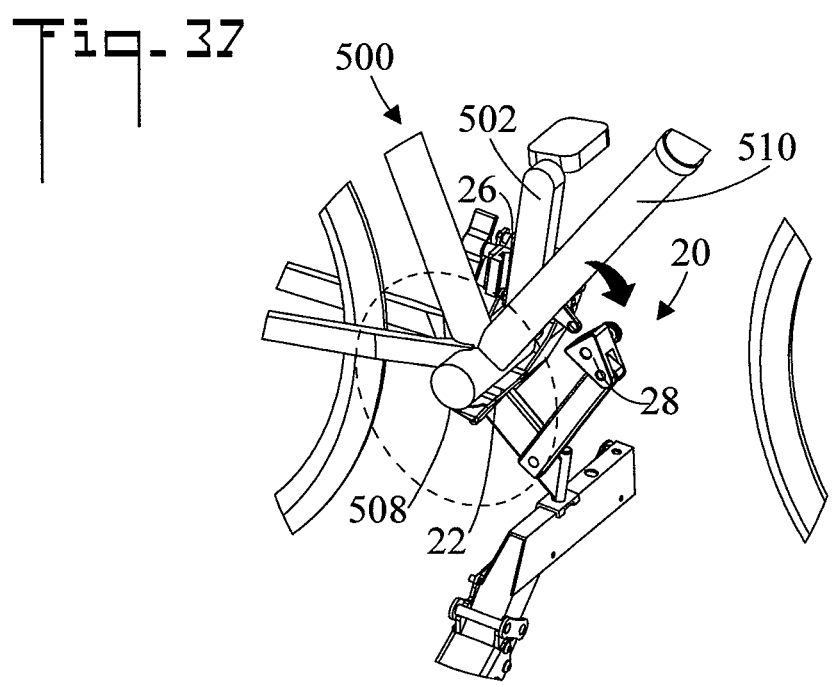
FIG. 37 is an enlarged fragmented right front perspective view as in FIG. 36 showing the bicycle lowered onto a crank axle housing support.

FIGS. 34 and 35 are left side and right side elevation views respectively of bicycle 500 ready for installation in apparatus 20, FIG. 36 is an enlarged fragmented right front perspective view of area 36 of FIG. 35, and FIG. 37 is an enlarged fragmented right front perspective view as in FIG. 36 showing bicycle 500 lowered onto crank axle housing support 22. Bicycle 500 is positioned above apparatus 20 so that crank axle housing 508 is above crank axle housing support 22. Cranks arm 502 is placed in a generally vertical position. Bicycle 500 is then lowered onto apparatus 20 so that crank axle housing 508 is received by crank axle housing support 22, and in the shown embodiment rests upon rests 24. It is noted that crank axle housing 508 rests upon, but is not fixedly connected to, crank axle housing support 22. It is also noted that bicycle 500 is lowered at a slight upward angle which facilitates connection of down tube connector 28. Referring to FIG. 37, once crank axle housing 508 is seated in crank axle housing support 22, bicycle 500 is rotate forward to engage down tube connector 28. Crank arm clamp 26 is then used to engage and hold crank arm 502, and down tube connector 28 is connected to down tube 510 as was previously described. It is noted that as shown the adjustments of crank arm clamp 26 and down tube connector 28 show in FIGS. 13, 14, and 30-33 have already been made to accommodate the particular style and size bicycle 500 being loaded. If these adjustments have not already been made, then they must be made during the loading process. Of course, once the crank arm clamp 26 and down tube connector 28 adjustments have been made for a particular bicycle, the adjustment need not be repeated for the same bicycle.

Figure 38:
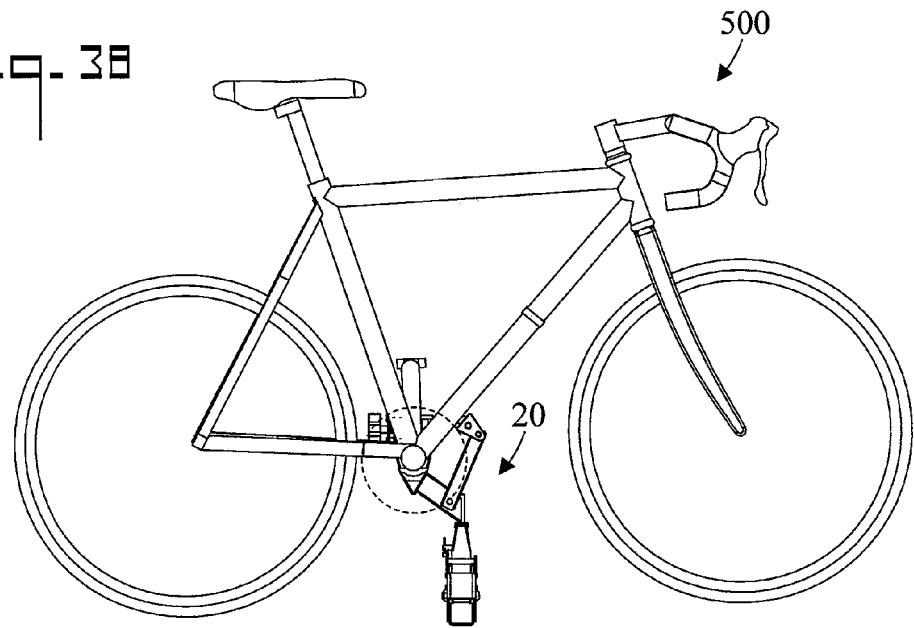
FIG. 38 is a right side elevation view of the bicycle connected to the apparatus.
Figure 39:
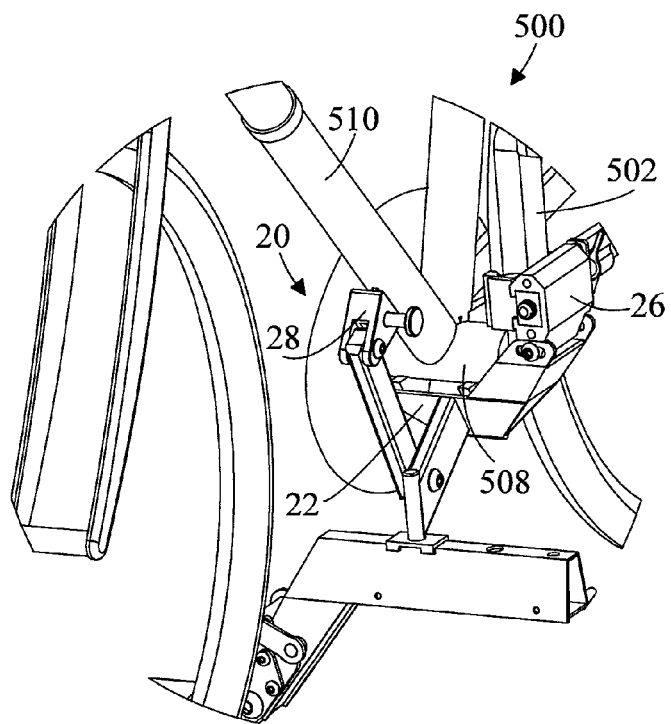
FIG. 39 is an enlarged fragmented left side perspective view of the bicycle connected to the apparatus.

FIG. 38 is a right side elevation view of bicycle 500 connected to apparatus 20, and FIG. 39 is an enlarged fragmented left side perspective view of bicycle 500 connected to apparatus 20. Crank axle housing 508 rests upon crank axle housing support 22, crank arm clamp 26 has been connected to crank arm 502, down tube connector 28 has been connected to down tube 510.

Figure 40:
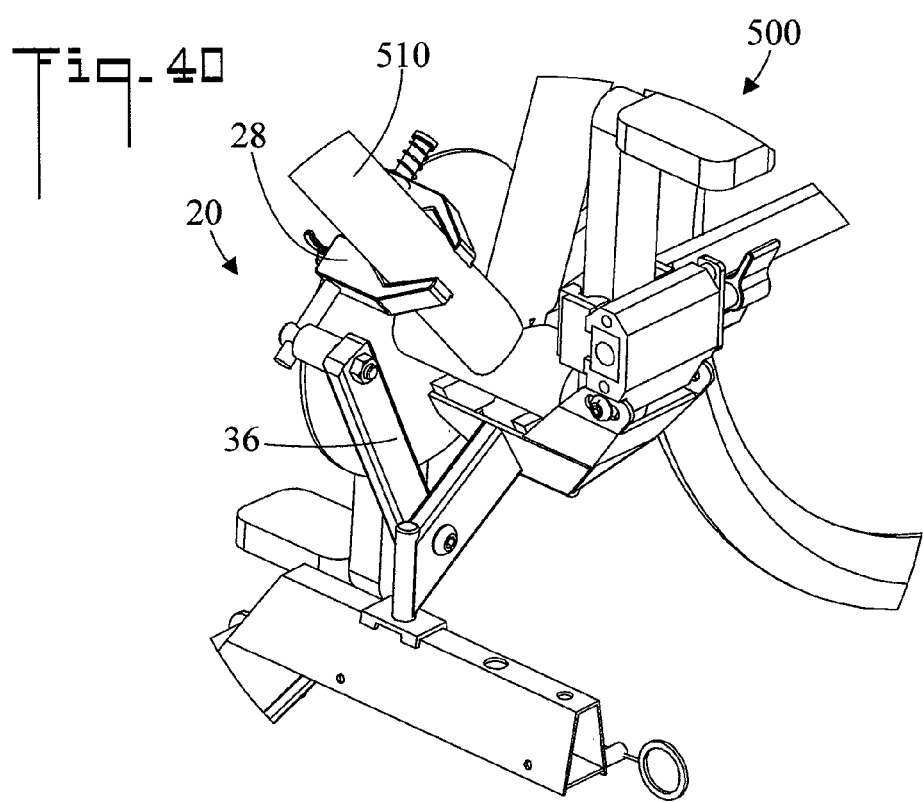
FIG. 40 is an enlarged fragmented left side perspective view of a second embodiment down tube connector.

FIG. 40 is an enlarged fragmented left side perspective view of a second embodiment down tube connector 28. In this embodiment down tube connector is a clamp having two jaws which removably clamp around down tube 510. As shown, the clamp is connected to down tube connector support arm 36.

Figure 41:
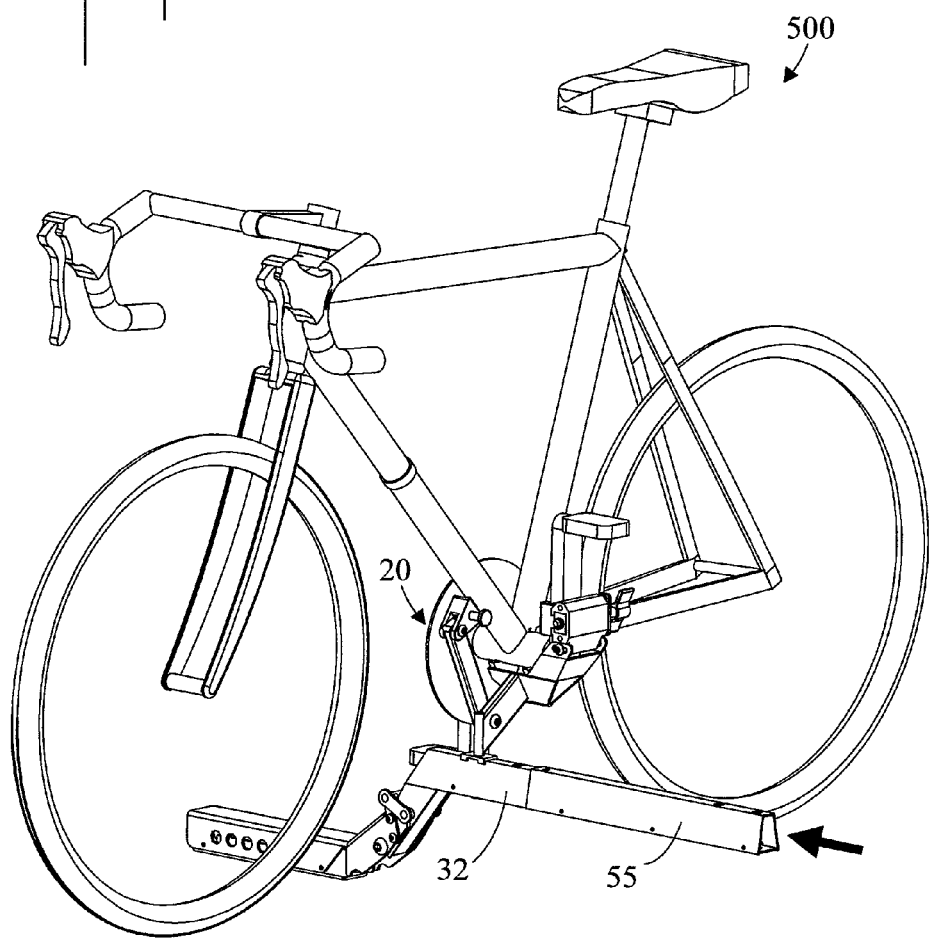
FIG. 41 is an enlarged left front perspective view of the apparatus showing a bicycle support beam extension.

FIG. 41 is an enlarged left front perspective view of apparatus 20 showing a bicycle support beam extension 55. Bicycle support beam extension 55 is shaped and dimensioned to longitudinally connect to bicycle support beam 32, thereby allowing additional bicycles 500 to be carried by apparatus 20. In an embodiment, bicycle support beam 32 is long enough to accommodate two bicycles 500, and bicycle support beam extension 55 can be long enough to accommodate two additional bicycles 500.

FIG. 42 is an enlarged perspective view of apparatus 20 in a partially folded configuration. Hitch insertion beam 30 is rotatably connected to bicycle support beam 32. In the in-use position shown in FIGS. 9-12, hitch insertion beam 30 is disposed parallel to bicycle support beam 32, wherein bicycle support beam 32 extends outwardly from hitch insertion beam 30. Once removed from receiver tow hitch 602 of vehicle 600 (refer to FIGS. 5, 45, and 47), hitch insertion beam 30 is rotatable to a storage position parallel to bicycle support beam 32, wherein hitch insertion beam 30 is folded back toward bicycle support beam 32.

FIGS. 43 and 44 are an enlarged perspective views of apparatus 20 in a fully folded configuration. Hitch insertion beam 30 has been folded to the storage configuration of FIG. 42. As described under FIGS. 9-12, support arm 34 has a proximal end 35 which is rotatably connected to bicycle support beam 32, and a distal end 37 which is connected to crank axle housing support 22. Support arm 34 is rotatable to an in-use position perpendicular to bicycle support beam 32 (as in shown in FIGS. 9-12, and 42), and to a storage position parallel to bicycle support beam 32 (as is shown in FIGS. 43 and 44). To effect this rotation, proximal end 35 of support arm 34 includes flange 39 which is rotatable to an in-use position parallel to bicycle support beam 32 (as is shown in FIGS. 9-12, and 42), and to a storage position which is perpendicular to bicycle support beam (as is shown in FIGS. 43 and 44). It is noted that flange 39 has two slots 81 which permit flange 39 and attached pivot 50 and support arm 34 to be loosened by nut 52, rotated 90 degrees, and then re-tightened (also refer to FIGS. 43 and 44).

FIG. 45-46 are reduced side elevation and rear elevation views respectively of motor vehicle 600 with apparatus 20 and a bicycle 500 installed. In FIG. 45 it is noted that bicycle 500 is disposed in a substantially vertical plane VP which is substantially perpendicular to the horizontal supports surface 700 (such as a road). Also in FIG. 46 it is noted that bicycle 500 is substantially level, that is not pitched forward or back with respect to horizontal support surface 700.

Figure 47:
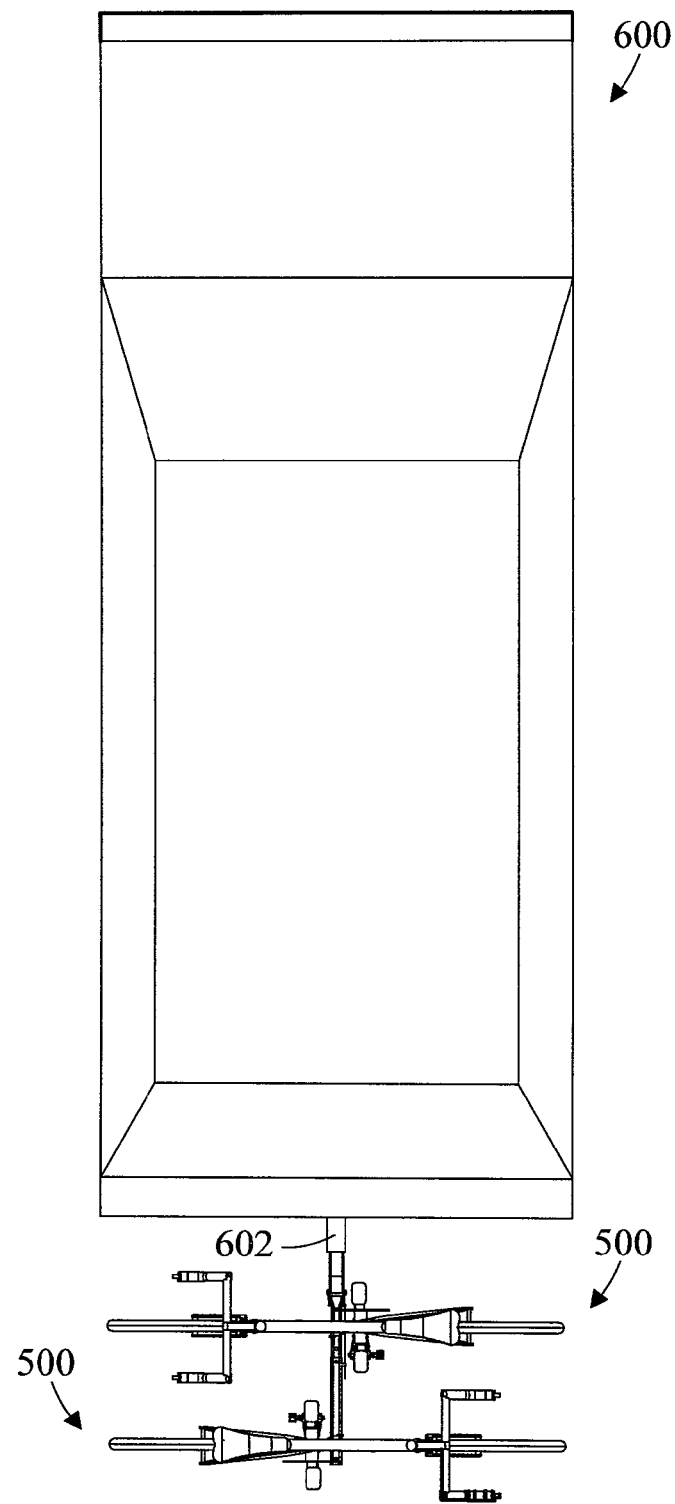
FIG. 47 is a reduced top plan view of the motor vehicle, the apparatus, and two bicycles.

FIG. 47 is a reduced top plan view of motor vehicle 600, apparatus 20, and two bicycles 500. It is noted, that the outboard bicycle 500 is rotated 180° with respect to the inboard bicycle 500 in order to avoid handlebar interference, and to therefore permit more bicycles 500 to be placed side by side for a given beam length. In other words, adjacent bicycles 500 are turned 180° from each other.

Figure 52:
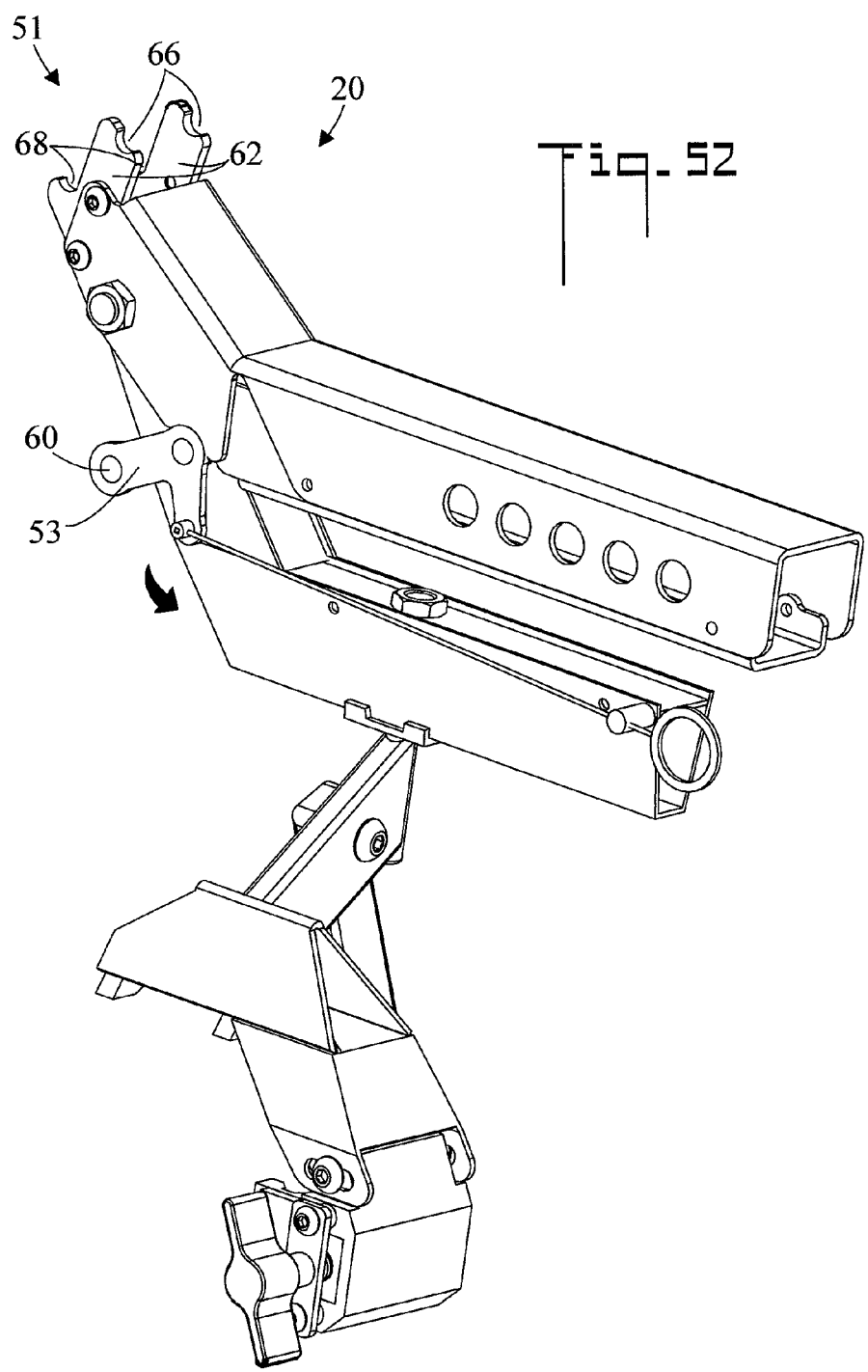
FIG. 52 is an enlarged perspective view of the locking mechanism with the apparatus in the folded configuration.

FIGS. 48 and 49 are enlarged perspective view of a locking mechanism 51 which locks bicycle support beam 32 in one of (1) an in-use position (FIGS. 48 and 49), and (2) a lowered position (FIGS. 50 and 51). Crank axle housing support 22, crank arm connector (clamp 26), and down tube connector 28 are connected to bicycle support beam 32 as previously described. Locking mechanism 51 includes two spaced apart brackets 53 which are pivotally connected by a pivot 54 to an extension 56 of bicycle support beam 32. A spring (not shown) rotationally biases brackets 53 in the direction of arrow 58 toward hitch insertion beam 30. A cross beam 60 is connected between the two brackets 53. Locking mechanism 51 further includes a pair of lock brackets 62 which are connected to an extension 64 of hitch insertion beam 30. Referring also to FIG. 52, each lock bracket 62 includes an in-use notch 66 (which is best seen in FIGS. 50 and 51) and a lowered notch 68 (which is best seen in FIG. 52).

When apparatus 20 is in the in-use position of FIGS. 48 and 49, cross member 60 resides in in-use notches 66. Conversely when apparatus 20 is in the lowered position of FIGS. 50 and 51, cross member 60 resides in lowered notches 68. A pull ring 70 is attached by a cable 72 to one end of one bracket 53, and when pulled in direction 90 disengages cross member 60 from in-use notches 66. To move bicycle support beam 32 from the raised in-use position of FIGS. 48 and 49 to the lowered position of FIGS. 50 and 51 the following steps are taken: (1) slightly raise the end of bicycle support beam 32 in direction 92, (2) pull pull ring 70 to disengage cross member 60 from in-use notches 66, (3) release pull ring 70, and lower bicycle support beam 32 until cross member 60 engages lowered notches 68. It may be appreciated that the shown locking mechanism 51 is only one way to affect the rotary connection of bicycle support beam 32 to hitch insertion beam 30.

FIGS. 50 and 51 are enlarged perspective views of locking mechanism 51 locking apparatus 20 in a lowered position. The lowered position is useful when opening the back door of motor vehicle 600 (refer to FIGS. 45 and 46). To return apparatus 20 to the in-use position of FIGS. 48 and 49, bicycle support beam 32 is raised in direction 94 until cross member 60 engage in-use notches 66.

FIG. 52 is an enlarged perspective view of locking mechanism 51 with apparatus 20 in the folded (storage) configuration as shown in FIGS. 42-44. Lock brackets 62, in-use notches 66, and lowered notches 68 are shown.

Figure 53:
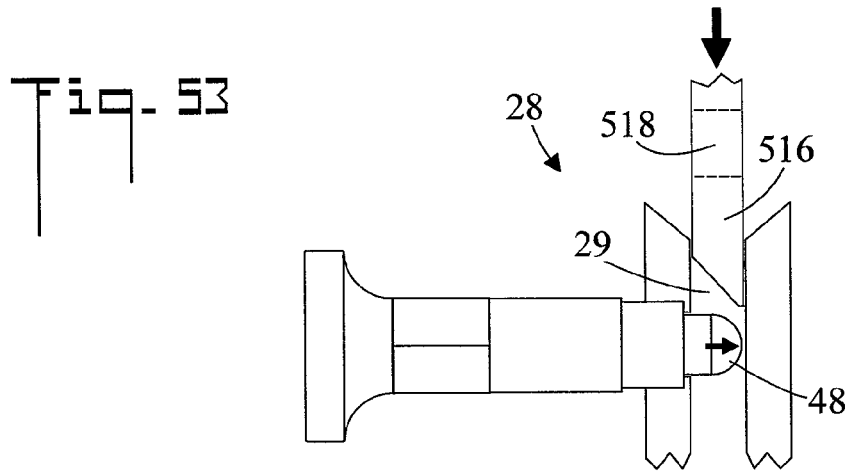
FIG. 53 is an enlarged side elevation view of a down tube connector prior to engagement.
Figure 54:
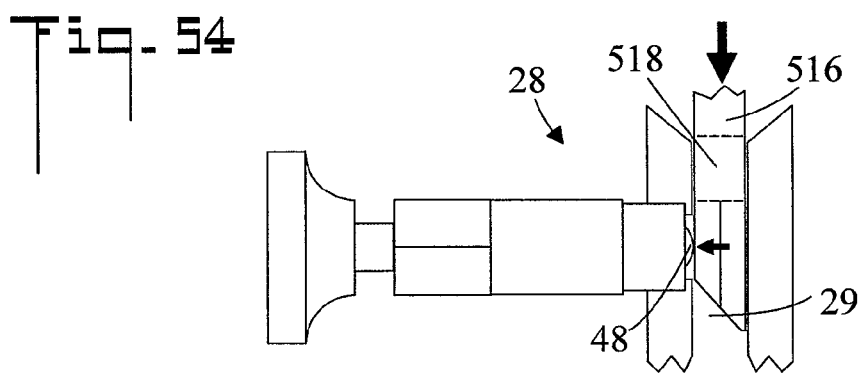
FIG. 54 is an enlarged side elevation view of the down tube connector being engaged.
Figure 55:
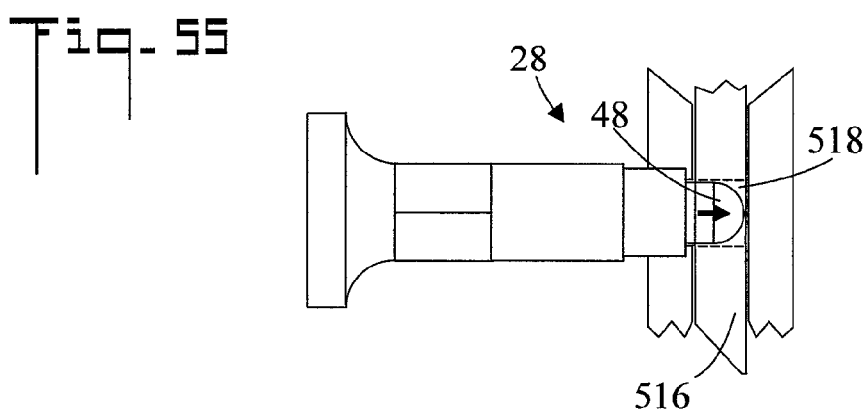
FIG. 55 is an enlarged side elevation view of the down tube connector engaged; and, FIG. 56 is an enlarged cross sectional view of a pin.
Figure 56:
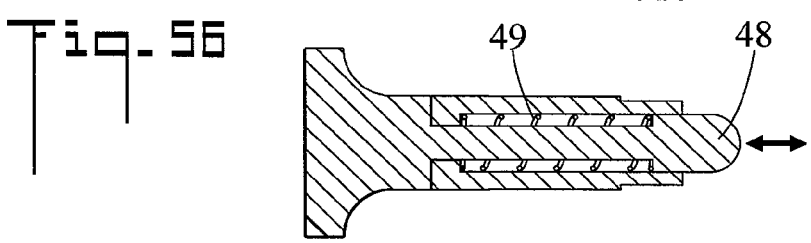

FIG. 53 through 55 show the sequence of engagement of down tube connector 28. In FIG. 53 flange 516 having aperture 518 is positioned in slot 29. Pin 48 is spring loaded into slot 29. In FIG. 54 flange 516 has been inserted into slot 29 where in a beveled end of flange 516 engages the rounded end of pin 48 and forces pin 48 out of slot 29 in the direction of the arrow. In FIG. 55 flange 516 is further inserted into slot 29 until pin 48 aligns with aperture 518. When so aligned, pin 48 is spring loaded into aperture 518 in the direction of the arrow, thereby effecting the connection of flange 516 to apparatus 20. FIG. 56 is an enlarged cross sectional view of pin 48 showing the biasing spring 49. In and embodiment, pin 48 comprises a knob-handle plunder which is well known in the art.

In terms of use, a method for connecting a bicycle to a motor vehicle includes: (refer to FIGS. 1-56)

(a) providing a bicycle 500 having a crank arm 502, a crank axle housing 508, and a down tube 510;

(b) providing a motor vehicle 600;

(c) providing apparatus 20 for connecting the bicycle 500 to the motor vehicle 600 including;

a crank axle housing support 22 which is shaped and dimensioned to receive the crank axle housing 508;

a crank arm connector connected to the crank axle housing support 22, the crank arm connector connectable to the crank arm 502;

a down tube connector 28 connected to the crank axle housing support 22, the down tube connector 28 connectable to the down tube 510;

(d) connecting the apparatus 20 to the motor vehicle 600;

(e) lowering the bicycle 500 so that the crank axle housing 508 is received by the crank axle housing support 22;

(f) connecting the crank arm connector 26 to the crank arm 502; and, (g) connecting the down tube connector 28 to the down tube 510.

The method further including:

in (b), the motor vehicle 600 having a receiver tow hitch 602;

in (c), a bicycle support beam 32 which as shaped and dimensioned to receive the crank axle housing support 22;

in (c), a hitch insertion beam 30 connected to the bicycle support beam 32, the hitch insertion beam 30 shaped and dimensioned to be removably received by the receiver tow hitch 602; and, in (d), inserting the hitch insertion beam 30 into the receiver tow hitch 602.

The method further including:

before (e), placing the crank arm 502 in a substantially vertical position.

The method further including:

after (e), the crank arm 502 having a horizontal position and a crank arm angle;

in (c), the crank arm connector including a crank arm clamp 26 which removably clamps onto the crank arm 502, the crank arm clamp 26 horizontally positionable to accommodate various crank arm 502 horizontal positions, and the crank arm clamp 26 angularly rotatable to accommodate various crank arm angles;

during (f), as necessary, horizontally positioning and angularly rotating the crank arm clamp 26 to align with the crank arm 502; and, locking the crank arm clamp 26 in the horizontal position and the rotated position.

The method further including:

in (c), a down tube connector support arm 36 having a proximal end 38 and an opposite distal end 40;

in (c), the proximal end 38 rotatably connected to the crank axle housing support 22, and the distal end 40 rotatably connected to the down tube connector 28, in (c), the down tube connector support 36 arm rotatable to a desired angular position with respect to vertical V and lockable in position;

in (c), the down tube connector 28 rotatable to a desired angular position with respect to the down tube connector support arm 36 and lockable in position; and, during (g), as necessary, angularly rotating the down tube connector support arm 36 and angularly rotating the down tube connector 28 to align with the down tube 510;

locking the down tube support arm 36 in the rotated position; and, locking the down tube connector 28 in the rotated position.

The method further including:

in (a), the down tube 510 having a flange 516 with an aperture 518;

in (c), the down tube connector 28 including a pin 48 which is shaped to removably engage the aperture 518 of the flange 516; and, in (g), causing the pin 48 to engage the aperture 518 of the flange 516.

The method further including:

in (c), a bicycle support beam 32;

in (c), a bicycle support beam extension 55 which is shaped and dimensioned to longitudinally connect to the bicycle support beam 32, thereby allowing additional bicycles 500 to be carried by the apparatus; and, connecting the bicycle support beam extension 55 to the bicycle support beam 32.

The embodiments of the apparatus and method of use described herein are exemplary and numerous modifications, combinations, variations, and rearrangements can be readily envisioned to achieve an equivalent result, all of which are intended to be embraced within the scope of the appended claims. Further, nothing in the above-provided discussions of the apparatus and method should be construed as limiting the invention to a particular embodiment or combination of embodiments. The scope of the invention is defined by the appended claims.

I claim:

1. Apparatus for connecting a bicycle to a motor vehicle, the bicycle having a crank arm, a crank axle housing, and a down tube, the crank arm having a horizontal position and a crank arm angle, the apparatus comprising:

a crank axle housing support which is shaped and dimensioned to receive the crank axle housing;

a crank arm connector connected to said crank axle housing support, said crank arm connector connectable to the crank arm;

a down tube connector connected to said crank axle housing support, said down tube connector connectable to the down tube;

said crank arm connector including a crank arm clamp which removably clamps onto the crank arm;

said crank arm clamp horizontally positionable to accommodate various horizontal positions of the crank arm; and, said crank arm clamp angularly rotatable to accommodate various crank arm angles of the crank arm.

2. The apparatus according to claim 1, further including:

said crank arm clamp connected to said crank axle housing support by a pivot member which is positionable in a horizontal slot, so that said crank arm clamp can both rotate and move along said horizontal slot, and be locked in a desired position.

3. Apparatus for connecting a bicycle to a motor vehicle, the bicycle having a crank arm, a crank axle housing, and a down tube, the apparatus comprising:

a crank axle housing support which is shaped and dimensioned to receive the crank axle housing;

a crank arm connector connected to said crank axle housing support, said crank arm connector connectable to the crank arm;

a down tube connector connected to said crank axle housing support, said down tube connector connectable to the down tube;

said crank arm connector including a crank arm clamp which removably clamps onto the crank arm; and, said crank arm clamp including a threaded member which has both left and right handed threads.

4. Apparatus for connecting a bicycle to a motor vehicle, the bicycle having a crank arm, a crank axle housing, and a down tube, the apparatus comprising:

a crank axle housing support which is shaped and dimensioned to receive the crank axle housing;

a crank arm connector connected to said crank axle housing support, said crank arm connector connectable to the crank arm;

a down tube connector connected to said crank axle housing support, said down tube connector connectable to the down tube;

a down tube connector support arm having a proximal end and an opposite distal end;

said proximal end rotatably connected to said crank axle housing support, and said distal end rotatably connected to said down tube connector;

said down tube connector support arm rotatable to a desired angular position with respect to vertical and lockable in position; and, said down tube connector rotatable to a desired angular position with respect to said down tube connector support arm and lockable in position.

5. Apparatus for connecting a bicycle to a motor vehicle, the bicycle having a crank arm, a crank axle housing, and a down tube, the apparatus comprising:
- a crank axle housing support which is shaped and dimensioned to receive the crank axle housing;
- a crank arm connector connected to said crank axle housing support, said crank arm connector connectable to the crank arm;
- a down tube connector connected to said crank axle housing support, said down tube connector connectable to the down tube;
- a bicycle support beam;
- a hitch insertion beam rotatably connected to said bicycle support beam;
- in an in-use position said hitch insertion beam being disposed parallel to said bicycle support beam wherein said bicycle support beam extends outwardly from said hitch insertion beam; and,
- said hitch insertion beam rotatable to a storage position parallel to said bicycle support beam, wherein said hitch insertion beam is folded back toward said bicycle support beam.

6. Apparatus for connecting a bicycle to a motor vehicle, the bicycle having a crank arm, a crank axle housing, and a down tube, the apparatus comprising:
- a crank axle housing support which is shaped and dimensioned to receive the crank axle housing;
- a crank arm connector connected to said crank axle housing support, said crank arm connector connectable to the crank arm;
- a down tube connector connected to said crank axle housing support, said down tube connector connectable to the down tube;
- a bicycle support beam;
- a hitch insertion beam rotatably connected to said bicycle support beam;
- said crank axle housing support, said crank arm connector, and said down tube connector connected to said bicycle support beam;
- a locking mechanism for locking said bicycle support beam in one of (1) an in-use position, and (2) a lowered position;
- said locking mechanism including a cross beam, two in-use notches, and two lowered notches; and,
- wherein in said in-use position said cross beam resides in said two in-use notches, and in said lowered position said cross beam resides in said two lowered notches.

7. The apparatus according to claim 6, further including:
a pull ring and cable for disengaging said cross beam from either said two in-use notches or said two lowered notches.

8. A method for connecting a bicycle to a motor vehicle, comprising:
(a) providing a bicycle having a crank arm, a crank axle housing, and a down tube;
(b) providing a motor vehicle;
(c) providing apparatus for connecting said bicycle to said motor vehicle including;
- a crank axle housing support which is shaped and dimensioned to receive said crank axle housing;
- a crank arm connector connected to said crank axle housing support, said crank arm connector connectable to said crank arm;
- a down tube connector connected to said crank axle housing support, said down tube connector connectable to said down tube;
(d) connecting said apparatus to said motor vehicle;
(e) lowering said bicycle so that said crank axle housing is received by said crank axle housing support;
(f) connecting said crank arm connector to said crank arm;
(g) connecting said down tube connector to said down tube;
after (e), said crank arm having a horizontal position and a crank arm angle;
in (c), said crank arm connector including a crank arm clamp which removably clamps onto said crank arm, said crank arm clamp horizontally positionable to accommodate various said crank arm horizontal positions, and said crank arm clamp angularly rotatable to accommodate various said crank arm angles;
during (f), as necessary, horizontally positioning and angularly rotating said crank arm clamp to align with said crank arm; and,
locking said crank arm clamp in said horizontal position and said rotated position.

9. Apparatus for connecting a bicycle to a motor vehicle, the bicycle having a crank arm, a crank axle housing, and a down tube, the crank arm having a front side, and an opposite rear side, the apparatus comprising:
- a crank axle housing support which is shaped and dimensioned to receive the crank axle housing;
- a crank arm connector connected to said crank axle housing support, said crank arm connector connectable to the crank arm;
- said crank arm connector including a crank arm clamp which removably clamps onto the crank arm; and,
- said crank arm clamp having two jaws, one of which contacts the front side of the crank arm, and the other of which contacts the rear side of the crank arm.

10. The apparatus according to claim 9, further including:
each said jaw including a longitudinal groove.

11. The apparatus according to claim 10, further including:
said longitudinal groove having two outwardly angled sides.

12. The apparatus according to claim 9, further including:
said two jaws only contacting the front and rear sides of the crank arm.

* * * * *